US012492268B2

(12) United States Patent
Mori et al.

(10) Patent No.: US 12,492,268 B2
(45) Date of Patent: Dec. 9, 2025

(54) MATERIAL FOR LOCATING GAS LEAK, METHOD FOR LOCATING GAS LEAK, MATERIAL FOR REPAIRING GAS LEAK, METHOD FOR REPAIRING GAS LEAK, AND DEVICE FOR REPAIRING GAS LEAK

(71) Applicant: DEXERIALS CORPORATION, Tochigi (JP)

(72) Inventors: Yasutaka Mori, Tochigi (JP); Takaaki Kubota, Tochigi (JP); Tetsuya Abe, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 686 days.

(21) Appl. No.: 17/907,294

(22) PCT Filed: Mar. 4, 2021

(86) PCT No.: PCT/JP2021/008327
§ 371 (c)(1),
(2) Date: Sep. 26, 2022

(87) PCT Pub. No.: WO2021/192878
PCT Pub. Date: Sep. 30, 2021

(65) Prior Publication Data
US 2023/0113758 A1 Apr. 13, 2023

(30) Foreign Application Priority Data

Mar. 27, 2020 (JP) .................................. 2020-058426
Jun. 30, 2020 (JP) .................................. 2020-112793

(51) Int. Cl.
*F16L 55/175* (2006.01)
*C08F 2/48* (2006.01)
*C09B 67/22* (2006.01)
*F16L 55/18* (2006.01)

(52) U.S. Cl.
CPC ............ *C08F 2/48* (2013.01); *C09B 67/0033* (2013.01); *F16L 55/175* (2013.01); *F16L 55/18* (2013.01)

(58) Field of Classification Search
CPC ...... C08F 2/48; C09B 67/033; F16L 155/175; C09D 5/34; C09J 4/00; C09K 3/12
USPC .......................................................... 524/97
See application file for complete search history.

(56) References Cited

U.S. PATENT DOCUMENTS

| 2008/0033087 | A1 | 2/2008 | Okamoto et al. |
| 2015/0175861 | A1* | 6/2015 | Nagata .................. F16J 15/022 524/588 |
| 2020/0124224 | A1 | 4/2020 | Mori et al. |
| 2021/0388248 | A1 | 12/2021 | Mori et al. |

FOREIGN PATENT DOCUMENTS

| JP | 2010-100711 | 5/2010 |
| JP | 2011-179552 | 9/2011 |
| JP | 2016-038381 | 3/2016 |
| JP | 2017-089878 | 5/2017 |
| JP | 2019-095032 | 6/2019 |
| JP | 6571851 | 9/2019 |
| JP | 2019-203111 | 11/2019 |
| WO | 2005/108493 | 11/2005 |
| WO | 2019/225283 | 11/2019 |

OTHER PUBLICATIONS

International Search Report for PCT/JP2021/008327 mailed on May 11, 2021.

* cited by examiner

*Primary Examiner* — Ruiyun Zhang
(74) *Attorney, Agent, or Firm* — IPUSA, PLLC

(57) ABSTRACT

Provided is a gas leak locating material used for locating a gas leaking position by application thereof at a position suspected to have a gas leak. The gas leak locating material satisfies the following formula: A/B≥21.0, where A represents a viscosity (Pa·s) of the gas leak locating material at 25° C. at a shear rate of $0.1$ $s^{-1}$ and B represents a viscosity (Pa·s) of the gas leak locating material at 25° C. at a shear rate of 10 $s^{-1}$. The gas leak locating material has an elastic modulus E' of 10 MPa or higher at 50° C. after being cured.

12 Claims, 10 Drawing Sheets

MATERIAL FOR LOCATING GAS LEAK, METHOD FOR LOCATING GAS LEAK, MATERIAL FOR REPAIRING GAS LEAK, METHOD FOR REPAIRING GAS LEAK, AND DEVICE FOR REPAIRING GAS LEAK

TECHNICAL FIELD

The present invention relates to a gas leak locating material and a gas leak locating method, a gas leak repairing material and a gas leak repairing method, and a gas leak repairing device.

BACKGROUND ART

Existing gas leak repairing methods have needed to locate gas leaking positions, and have repaired the gas leaking positions by welding or gas leak repairing materials formed of epoxy resins in a state where the gases are not leaking. On the other hand, if the gases are leaking, it is necessary to press on the resin-applied positions with pressures higher than the gas leaking pressures until the epoxy resins cure.

For example, a method proposed as a method for repairing a gas leak of, for example, a gas sealing device or a delivery conduit for circulating a gas locates a gas leaking position, subsequently applies a photo-curable resin to the gas leaking position and presses on the gas leaking position using a pressing tool to temporarily stop the gas leak, and cures the photo-curable resin while keeping the gas leaking position pressed (for example, see PTL 1).

CITATION LIST

Patent Literature

PTL 1: Japanese Patent Application Laid-Open (JP-A) No. 2017-89878

SUMMARY OF INVENTION

Technical Problem

However, the method recited in PTL 1 needs to locate a gas leaking position beforehand. Moreover, because photo-curing with a long wavelength is time-consuming, it is necessary to keep the gas leaking position pressed with the pressing tool until the gas leaking position cures. Hence, there are problems that the gas may leak again if there is any portion that has not been pressed with a sufficient strength, and that any position at which the gas leaking pressure is high cannot be repaired.

The present invention aims for solving the various problems in the related art and achieving an object described below. That is, the present invention has an object to provide a gas leak locating material with which it is easy to locate a gas leaking position with a simple action of application thereof at a position suspected to have a gas leak and a gas leak locating method, and a gas leak repairing material and a gas leak repairing method, and a gas leak repairing device that need not to locate a gas leaking position beforehand and can repair the gas leaking position easily in a short time even if the gas leaking level at the gas leaking position is high.

Solution to Problem

Means for solving the above problems are as follows.
<1> A gas leak locating material used for locating a gas leaking position by application of the gas leak locating material at a position suspected to have a gas leak,
  wherein the gas leak locating material satisfies the following formula: A/B≥21.0, where A represents a viscosity (Pa·s) of the gas leak locating material at 25° C. at a shear rate of $0.1\ s^{-1}$ and B represents a viscosity (Pa·s) of the gas leak locating material at 25° C. at a shear rate of $10\ s^{-1}$, and
  the gas leak locating material has an elastic modulus E' of 10 MPa or higher at 50° C. after being cured.
<2> The gas leak locating material according to <1>,
  wherein the viscosity A of the gas leak locating material at 25° C. at the shear rate of $0.1\ s^{-1}$ is 500 Pa·s or higher.
<3> The gas leak locating material according to <1> or <2>,
  wherein the gas leak locating material contains a curable resin composition.
<4> The gas leak locating material according to <3>,
  wherein the curable resin composition contains either or both of a polymerizable compound and a polymerization initiator.
<5> The gas leak locating material according to <4>,
  wherein the gas leak locating material further contains a colorant.
<6> The gas leak locating material according to any one of <1> to <5>,
  wherein the gas leak locating material cures by irradiation with light having a wavelength of 420 nm or shorter.
<7> A gas leak repairing material, including:
  the gas leak locating material according to any one of <1> to <6>,
  wherein the gas leak locating material is used for repairing the gas leaking position.
<8> A gas leak locating method, including:
  a gas leak locating step of forming a coating film formed of the gas leak locating material according to any one of <1> to <6> at the position suspected to have the gas leak, and locating a position at which a hole opens in the coating film due to the gas leak as the gas leaking position.
<9> A gas leak repairing method, including:
  a curing step of curing the coating film in which the gas leaking position located by the gas leak locating method according to <8> is included; and
  a repairing step of closing the gas leaking position that has been cured, with the gas leak repairing material according to <7>, and curing the gas leak repairing material.
<10> A gas leak repairing method, including:
  a step of curing the coating film with a tubular member disposed at the gas leaking position in the coating film in which the gas leaking position located by the gas leak locating method according to <8> is included, and
  a step of filling the tubular member with the gas leak repairing material according to <7>, subsequently connecting an openable/closable valve in an open state thereof to the tubular member that bores by a gas leaking pressure, and closing the openable/closable valve.
<11> A gas leak repairing device, including:
  a light source; and
  a film-shaped member or a tape-shaped member on an emitting side of the light source, the film-shaped member or the tape-shaped member having ultraviolet transmittance, wherein the gas leak repairing material according to <7> is attachable on the film-shaped member and the tape-shaped member.
<12> The gas leak repairing device according to <11>, wherein surfaces of the film-shaped member and the tape-shaped member have releasability.
<13> A gas leak repairing method, including:
using the gas leak repairing device according to <11> or <12>.

Advantageous Effects of Invention

The present invention can solve the various problems in the related art, achieve the object described above, and provide a gas leak locating material with which it is easy to locate a gas leaking position with a simple action of application thereof at a position suspected to have a gas leak and a gas leak locating method, and a gas leak repairing material and a gas leak repairing method, and a gas leak repairing device that need not to locate a gas leaking position beforehand and can repair the gas leaking position easily in a short time even if the gas leaking level at the gas leaking position is high.

Figure 1:
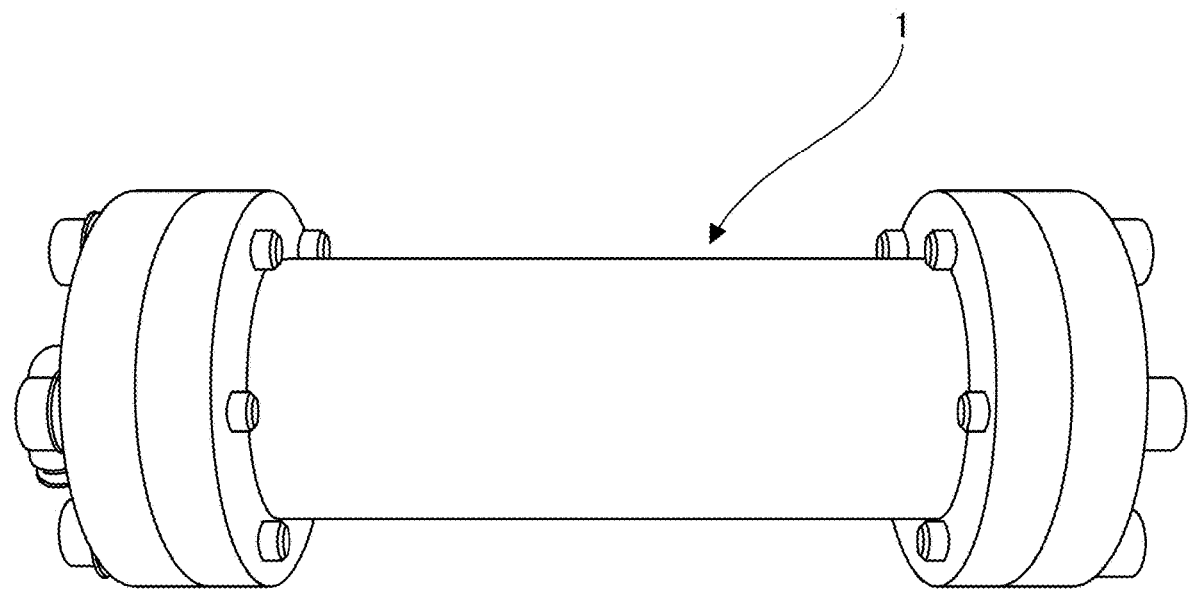
FIG. 1 is an image illustrating an example of a gas delivery conduit, which is a gas leak repairing target.

DESCRIPTION OF EMBODIMENTS (Gas Leak Locating Material)

A gas leak locating material of the present invention is a gas leak locating material used for locating a gas leaking position by application thereof at a position suspected to have a gas leak. When a viscosity (Pa·s) of the gas leak locating material at 25° C. at a shear rate of 0.1 s$^{-1}$ is represented as A and a viscosity (Pa·s) of the gas leak locating material at 25° C. at a shear rate of 10 s$^{-1}$ is represented as B, the gas leak locating material satisfies the following formula: A/B≥21.0. The gas leak locating material has an elastic modulus E' of 10 MPa or higher at 50° C. after being cured.

With the gas leak locating material of the present invention, it is easy to locate a gas leaking position with a simple action of applying the gas leak locating material at a position suspected to have a gas leak.

A position suspected to have a gas leak represents a range including a gas leaking position of the gas leak locating or repairing target, and a range including a position that has a likelihood of having a gas leak.

The method for applying the gas leak locating material is not particularly limited and may be appropriately selected in accordance with the intended purpose. Examples of the method include various coating methods.

Examples of the coating method include brush painting, a blade coating method, a gravure coating method, a gravure offset coating method, a wire bar coating method, a bar coating method, a roll coating method, a knife coating method, an air knife coating method, a comma coating method, a U comma coating method, an AKKU coating method, a smoothing coating method, a microgravure coating method, a reverse roll coating method, a four or five-roll coating method, a dip coating method, a curtain coating method, a slide coating method, a die coating method, and an inkjet method.

When a viscosity (Pa·s) of the gas leak locating material at 25° C. at a shear rate of 0.1 s$^{-1}$ is represented as A and a viscosity (Pa·s) of the gas leak locating material at 25° C. at a shear rate of 10 s$^{-1}$ is represented as B, the following formula: thixotropy ratio (A/B)≥21.0 is satisfied, and it is preferable that the following formula: thixotropy ratio (A/B) ≥80 be satisfied.

The viscosity A of the gas leak locating material at 25° C. at a shear rate of 0.1 s$^{-1}$ is preferably 500 Pa·s or higher and more preferably 1,000 Pa·s or higher.

Use of a gas leak locating material having a thixotropy ratio (A/B) of 21.0 or higher enables easy and secure locating of a gas leaking position, because when the gas leak locating material is applied at a position suspected to have a gas leak, the gas leak locating material will not be blown away by the gas leaking pressure at the gas leaking position and will keep some thickness when a hole opens in the coating film at the gas leaking position.

When the viscosity A of the gas leak locating material at 25° C. at a shear rate of 0.1 s$^{-1}$ is lower than 500 Pa·s, it is feared that the gas leak locating material applied may be blown away by the gas leaking pressure at the gas leaking position, and it is harder to repair the gas leaking position.

When the thixotropy ratio (A/B) of the gas leak locating material is lower than 21.0 and the viscosity A of the gas leak locating material at 25° C. at a shear rate of 0.1 s$^{-1}$ is 500 Pa·s or higher, a hole will not open in the coating film and a cavity is generated at the coating interface disadvantageously.

When the thixotropy ratio (A/B) of the gas leak locating material is 21.0 or higher and the viscosity A of the gas leak locating material at 25° C. at a shear rate of 0.1 s$^{-1}$ is 500 Pa·s or higher, it is easy to locate the gas leaking position and it is possible to repair the gas leaking position using the same gas leak locating material.

The viscosity of the gas leak locating material can be measured with, for example, AR-G2 available from TA Instruments Japan Inc.

The viscosity is measured in an environment at a temperature of 25° C. in a shear rate (shear speed) range of from 0.01 s$^{-1}$ through 100 s$^{-1}$, using a cone plate having a diameter of 20 mm and an angle of 2°. Values of the viscosity to be evaluated are those at a shear rate of 0.1 s$^{-1}$. The ratio (A/B) of the viscosity A at 25° C. at a shear rate of 0.1 s$^{-1}$ to the viscosity B at 25° C. at a shear rate of 10 s$^{-1}$ is defined as the thixotropy ratio.

The elastic modulus E', at 50° C., of the gas leak locating material after being cured is 10 MPa or higher and preferably 25 MPa or higher.

When the gas leak locating material having an elastic modulus E' of 10 MPa or higher at 50° C. after being cured is used, a hole readily opens in a coating film formed of the gas leak locating material by the gas leaking pressure. Therefore, it is easy to locate the gas leaking position and it is possible to observe a gas leak stop for 1 minute or longer in a gas leak seal test. When a gas leak locating material having an elastic modulus E' of lower than 10 MPa at 50° C. after being cured was used, a gas leak occurred in less than 1 minute (i.e., a gas leak occurred immediately) in the gas leak seal test. When a gas leak locating material having an elastic modulus E' of 25 MPa or higher at 50° C. after being cured was used, it was possible to observe a gas leak stop for 1 hour or longer in the gas leak seal test.

Here, for measuring the elastic modulus E' of the gas leak locating material at 50° C. after being cured, a sample gas leak locating material that is applied to have a thickness of 1 mm and cured using an UV light U1 available from JAXMAN is measured by temperature sweep in a range of from 25° C. through 100° C. in a tensile mode at a frequency of 10 Hz at a temperature elevation rate of 10° C./min using RSAIII available from TA Instruments Japan Inc., to thereby obtain the elastic modulus E' of the gas leak locating material at 50° C. after being cured.

In the present invention, it is preferable to use a gas leak locating material that cures by irradiation with light having a wavelength of 420 nm or shorter.

A gas leak locating material that cures by light having a wavelength of 420 nm or shorter can be cured in a shorter time than is a gas leak locating material that cures by light having a long wavelength, and it is possible to shorten the working time significantly.

The gas leak locating material of the present invention contains a curable resin composition.

The curable resin composition contains either or both of a polymerizable compound and a polymerization initiator, preferably contains a sensitizer, a photoacid generator, and a colorant, and further contains other components as needed.

The curable resin composition can be cured by various curing methods such as photo-curing, thermal curing, two-pack mixing (e.g., two-pack mix-type acrylic resins or epoxy resins), and moisture curing, or combinations of these methods. Among these methods, photo-curing is preferable in terms of the curing speed.

<Polymerizable Compound>

The polymerizable compound is a compound that causes a polymerization reaction in response to heating or active energy rays (e.g., ultraviolet rays and electron beams) and cures. Examples of the polymerizable compound include radical polymerizable group-containing compounds and cationic polymerizable group-containing compounds.

<<Radical Polymerizable Group-Containing Compound>>

The radical polymerizable group-containing compound (radical polymerizable component) is not particularly limited and may be appropriately selected in accordance with the intended purpose so long as the radical polymerizable group-containing compound is a compound that contains a radical polymerizable group.

Examples of the radical polymerizable group include a (meth)acryloyloxy group.

A (meth)acryloyloxy group represents an acryloyloxy group or a methacryloyloxy group.

The radical polymerizable group-containing compound may contain one or two or more radical polymerizable groups.

Examples of the radical polymerizable group-containing compound include ester compounds obtained by reacting (meth)acrylic acid with hydroxyl group-containing compounds, epoxy (meth)acrylates obtained by reacting (meth)acrylic acid with epoxy compounds, and urethane (meth)acrylates obtained by reacting isocyanate with hydroxyl group-containing (meth)acrylic acid derivatives.

(Meth)acrylic represents acrylic or methacrylic, and (meth)acrylate represents acrylate or methacrylate.

Examples of the radical polymerizable group-containing compound containing one radical polymerizable group include 2-hydroxyethyl(meth)acrylate, 2-hydroxypropyl (meth)acrylate, 4-hydroxybutyl (meth)acrylate, 2-hydroxybutyl (meth)acrylate, isobutyl (meth)acrylate, t-butyl (meth) acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, methoxyethylene glycol (meth)acrylate, 2-ethoxyethyl (meth)acrylate, tetrahydrofurfuryl (meth)acrylate, benzyl (meth)acrylate, ethyl carbitol (meth)acrylate, phenoxyethyl (meth)acrylate, phenoxydiethylene glycol (meth)acrylate, phenoxypolyethylene glycol (meth)acrylate, methoxypolyethylene glycol (meth)acrylate, 2,2,2-trifluoroethyl (meth)acrylate, 2,2,3,3-tetrafluoropropyl (meth)acrylate, 1H,1H,5H-octafluoropentyl (meth)acrylate, imide (meth)acrylate, methyl (meth)acrylate, ethyl (meth)acrylate, n-butyl (meth)acrylate, propyl (meth)acrylate, 2-ethylhexyl (meth)acrylate, n-octyl (meth)acrylate, isononyl (meth)acrylate, isomyristyl (meth)acrylate, isostearyl (meth)acrylate, 2-butoxyethyl (meth)acrylate, 2-phenoxyethyl (meth)acrylate, bicyclopentenyl (meth)acrylate, isodecyl (meth)acrylate, diethyl aminoethyl (meth)acrylate, dimethyl aminoethyl (meth)acrylate, 2-(meth)acryloyloxyethyl succinic acid, 2-(meth)acryloyloxyethyl hexahydrophthalic acid, 2-(meth)acryloyloxyethyl 2-hydroxypropyl phthalate, and 2-(meth)acryloyloxyethyl phosphate. One of these radical polymerizable group-containing compounds containing one radical polymerizable group may be used alone or two or more of these radical polymerizable group-containing compounds containing one radical polymerizable group may be used in combination.

Examples of the radical polymerizable group-containing compound containing two radical polymerizable groups include 1,4-butanediol di(meth)acrylate, 1,3-butanediol di(meth)acrylate, 1,6-hexanediol di(meth)acrylate, 1,9-nonanediol di(meth)acrylate, 1,10-decanediol di(meth)acrylate, 2-n-butyl-2-ethyl-1,3-propanediol di(meth)acrylate, dipropylene glycol di(meth)acrylate, tripropylene glycol di(meth)acrylate, polypropylene glycol (meth)acrylate, ethylene glycol di(meth)acrylate, diethylene glycol di(meth)acrylate, tetraethylene glycol di(meth)acrylate, polyethylene glycol di(meth)acrylate, propylene oxide-added bisphenol A di(meth)acrylate, ethylene oxide-added bisphenol A di(meth)acrylate, ethylene oxide-added bisphenol F di(meth)acrylate, dimethyloldicyclopentadienyl di(meth)acrylate, neopentyl glycol di(meth)acrylate, ethylene oxide-modified isocyanuric acid di(meth)acrylate, 2-hydroxy-3-(meth)acryloyloxypropyl (meth)acrylate, carbonate diol di(meth)acrylate, polyether diol di(meth)acrylate, polyester diol di(meth)acrylate, polycaprolactone diol di(meth)acrylate, and polybutadiene diol di(meth)acrylate. One of these radical polymerizable group-containing compounds containing two radical polymerizable groups may be used alone or two or more of these radical polymerizable group-containing compounds containing two radical polymerizable groups may be used in combination.

Examples of the radical polymerizable group-containing compound containing three or more radical polymerizable groups include pentaerythritol tri(meth)acrylate, trimethylolpropane tri(meth)acrylate, propylene oxide-added trimethylolpropane tri(meth)acrylate, ethylene oxide-added trimethylolpropane tri(meth)acrylate, caprolactone-modified trimethylolpropane tri(meth)acrylate, ethylene oxide-added isocyanuric acid tri(meth)acrylate, dipentaerythritol penta(meth)acrylate, dipentaerythritol hexa(meth)acrylate, ditrimethylolpropane tetra(meth)acrylate, pentaerythritol tetra(meth)acrylate, glycerin tri(meth)acrylate, propylene oxide-added glycerin tri(meth)acrylate, and tris(meth)acryloyloxyethyl phosphate. One of these radical polymerizable group-containing compounds containing three or more radical polymerizable groups may be used alone or two or more of these radical polymerizable group-containing compounds containing three or more radical polymerizable groups may be used in combination.

The radical polymerizable group-containing compound may be what is termed as an oligomer.

Examples of the oligomer include (meth)acrylate oligomers.

Examples of the (meth)acrylate oligomers include polyurethane (meth)acrylate oligomers, polyisoprene (meth)acrylate oligomers, polybutadiene (meth)acrylate oligomers, and polyether (meth)acrylate oligomers. Acrylic polymers that are mentioned below and to which radical polymerizable groups are imparted may also be used as the (meth)acrylate oligomers.

Acrylic polymers: butyl acrylate, 2-hexyl acrylate, and acrylic acid copolymers, cyclohexyl acrylate, and methacrylic acid copolymers The weight average molecular weight of the oligomer is not particularly limited, may be appropriately selected in accordance with the intended purpose, and is preferably from 1,000 through 100,000, more preferably from 2,000 through 80,000, and particularly preferably from 5,000 through 50,000. The weight average molecular weight may be measured by, for example, GPC (gel permeation chromatography).

<<Cationic Polymerizable Group-Containing Compound>>

The cationic polymerizable group-containing compound (cationic polymerizable component) is not particularly limited and may be appropriately selected in accordance with the intended purpose so long as the cationic polymerizable group-containing compound contains a functional group (cationic polymerizable group) that reacts with a proton or a carbocation that is derived from Bronsted acid or is produced through an action of Lewis acid.

The curable resin composition containing the cationic polymerizable group-containing compound may be a one-pack type or a two-pack type.

Examples of the cationic polymerizable group include an alkoxysilyl group, an epoxy group, a vinylether group, and an oxetanyl group. Among these cationic polymerizable group, an alkoxysilyl group and an epoxy group are preferable.

The alkoxysilyl group is not particularly limited and may be appropriately selected in accordance with the intended purpose. A group represented by General formula (1) below is preferable.

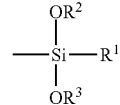

General formula (1)

In General formula (1), $R^1$ represents one selected from alkyl groups containing from 1 through 3 carbon atoms and alkoxy groups containing from 1 through 3 carbon atoms, and $R^2$ and $R^3$ each independently represent an alkyl group containing from 1 through 3 carbon atoms.

As the alkoxysilyl group, a trimethoxysilyl group, a triethoxysilyl group, a dimethoxymethyl silyl group, and a diethoxymethyl siliyl group are preferable in that they have an excellent cationic polymerizability.

The epoxy group may be an alicyclic epoxy group or a non-alicyclic epoxy group. Examples of the epoxy group include groups represented by General formula (2) below and General formula (3) below.

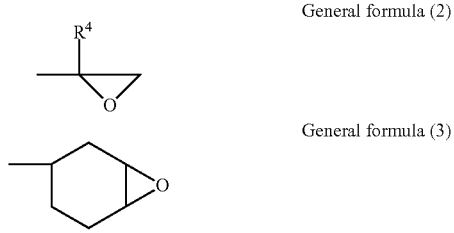

General formula (2)

General formula (3)

In General formula (2), $R^4$ represents a hydrogen atom or a methyl group.

It is preferable that the cationic polymerizable group-containing compound further contains a radical polymerizable group because the materials in the curable resin composition can have a better compatibility and a cured product of the curable resin composition can be prevented from undergoing a phase separation.

In the present invention, the cationic polymerizable group-containing compound containing the radical polymerizable group does not belong to the radical polymerizable group-containing compound, but belongs to the cationic polymerizable group-containing compound.

The cationic polymerizable group-containing compound containing the radical polymerizable group is not particularly limited and may be appropriately selected in accordance with the intended purpose. Examples of the cationic polymerizable group-containing compound containing the radical polymerizable group include a compound represented by General formula (4) below.

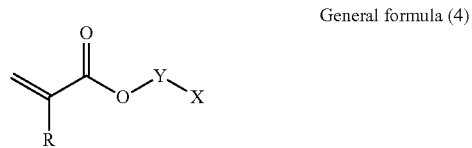

General formula (4)

In General formula (4), R represents a hydrogen atom or a methyl group, X represents a cationic polymerizable group, and Y represents a divalent linking group.

Examples of X include a group represented by General formula (1) above, a group represented by General formula (2) above, and a group represented by General formula (3) above.

Examples of Y include an alkylene group and an alkylene-oxy-alkylene group. Examples of the alkylene group include $C_1$ to $C_6$ alkylene groups. Examples of the alkylene-oxy-alkylene group include $C_1$ to $C_6$ alkylene-oxy-$C_1$ to $C_6$ alkylene groups. $C_1$ to $C_6$ represents a number of carbon atoms of from 1 through 6.

Examples of the cationic polymerizable group-containing compound containing the radical polymerizable group, which is a compound represented by General formula (4) above, include 3,4-epoxycyclohexylmethyl (meth)acrylate, (3-ethyloxetan-3-yl)methyl acrylate, (3-ethyloxetan-3-yl) methyl methacrylate, glycidyl (meth)acrylate, 4-hydroxybutyl (meth)acrylate glycidyl ether, 2-(2-vinyloxyethoxy) ethyl acrylate, and 2-(2-vinyloxyethoxy)ethyl methacrylate. One of these cationic polymerizable group-containing compounds containing the radical polymerizable group may be used alone or two or more of these cationic polymerizable group-containing compounds containing the radical polymerizable group may be used in combination.

<Polymerization Initiator>

Examples of the polymerization initiator include a thermal polymerization initiator and a photo-polymerization initiator. Of these polymerization initiators, a photo-polymerization initiator is preferable.

The photo-polymerization initiator needs only to be able to produce active species such as radicals and cations in response to optical (particularly, ultraviolet) energy and initiate polymerization of a polymerizable compound. One of, or two or more of, for example, radial polymerization initiators, cationic polymerization initiators, and base generators may be used alone or in combination. Among these, a radical polymerization initiator is preferable.

Examples of the radical polymerization initiator include aromatic ketones, acylphosphine oxide compounds, aromatic onium salt compounds, organic peroxides, thio compounds (e.g., thioxanthone compounds and thiophenyl group-containing compounds), hexaaryl biimidazole compounds, ketoxime ester compounds, borate compounds, azinium compounds, metallocene compounds, active ester compounds, carbon-halogen bond-containing compounds, and alkylamine compounds. One of these radical polymerization initiators may be used alone or two or more of these radical polymerization initiators may be used in combination.

<Sensitizer>

The curable resin composition may contain a sensitizer in order to prevent degradation of its curing speed due to light (particularly, ultraviolet rays) being absorbed or shielded when the curable resin composition is irradiated with light (particularly, ultraviolet rays).

Examples of the sensitizer include: cyclic amine-based compounds such as aliphatic amines, aromatic group-containing amines, and piperidine; urea-based compounds such as o-tolyl thiourea; sulfur compounds such as sodium diethyl thiophosphate, and soluble salts of aromatic sulfinic acids; nitrile compounds such as N,N'-disubstituted-p-aminobenzonitrile; phosphorous compounds such as tri-n-butyl phosphine and sodium diethyl dithio phosphide; and nitrogen compounds such as Michler ketone, N-nitrosohydroxyl amine derivatives, oxazolidine compounds, tetrahydro-1,3-oxazine compounds, formaldehyde, and condensate of acetaldehyde and diamine. One of these sensitizers may be used alone or two or more of these sensitizers may be used in combination.

<Photoacid Generator>

It is preferable that the curable resin composition contain a photoacid generator, which is a compound that absorbs light and produces an acid.

An onium salt is preferable as the photoacid generator.

Examples of the onium salt include diazonium salt, iodonium salt, and sulfonium salt. One of these onium salts may be used alone or two or more of these onium salts may be used in combination. Among these onium salts, iodonium salt and sulfonium salt are preferable in terms of stability.

<Colorant>

It is preferable that the curable resin composition contain a colorant, because a coating film can be colored and it becomes easier to locate the position to be repaired.

The colorant is not particularly limited and may be appropriately selected in accordance with the intended purpose. Pigments and dyes can be used. Pigments are preferred.

As the pigment, inorganic pigments or organic pigments can be used. One of these pigments may be used alone or two or more of these pigments may be used in combination. Mixed crystals may be used as the pigment.

As the pigment, for example, black pigments, yellow pigments, magenta pigments, cyan pigments, white pigments, green pigments, orange pigments, and gloss pigments and metallic pigments such as gold and silver can be used.

As the inorganic pigment, for example, titanium oxide, zinc oxide, aluminum oxide, talc, silica, iron oxide, calcium carbonate, barium sulfate, aluminum hydroxide, barium yellow, cadmium red, chrome yellow, and carbon black produced by known methods such as a contact method, a furnace method, and a thermal method can be used.

Examples of the organic pigment include azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye chelates and acid dye chelates), nitro pigments, nitroso pigments, and aniline black. Among these organic pigments, those that have a good affinity with a solvent are preferable. In addition, resin hollow particles and inorganic hollow particles can also be used.

Specific examples of the pigment for black include carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Examples of the pigment for colors include C.I. Pigment Yellow 1, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 138, 150, 153, 155, 180, 185, 213, C.I. Pigment Orange 5, 13, 16, 17, 36, 43, 51, C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, 264, C.I. Pigment Violet 1 (Rhodamine Lake), 3, 5:1, 16, 19, 23, 38, C.I. Pigment Blue 1, 2, 15 (Phthalocyanine Blue), 15:1, 15:2, 15:3, 15:4 (Phthalocyanine Blue), 16, 17:1, 56, 60, 63, C.I. Pigment Green 1, 4, 7, 8, 10, 17, 18, and 36. One of these pigments may be used alone or two or more of these pigments may be used in combination.

—Other Components—

The other components are not particularly limited and may be appropriately selected in accordance with the intended purpose. Examples of the other components include a surfactant, a viscosity modifier, a tackifier, an antioxidant, an age resistor, a crosslinking promoter, an ultraviolet absorbent, a plasticizer, a preservative, and a dispersant.

With the gas leak locating material of the present invention, it is possible to locate the gas leaking position easily with a simple action of applying the gas leak locating material at a position suspected to have a gas leak.

A method for locating a gas leaking position using the gas leak locating material of the present invention can be carried out suitably according to a gas leak locating method of the present invention described below.

(Gas Leak Locating Method)

A gas leak locating method of the present invention includes a gas leak locating step and further includes other steps as needed.

<Gas Leak Locating Step>

The gas leak locating step is a step of forming a coating film formed of the gas leak locating material of the present invention at a position suspected to have a gas leak, and locating a position at which a hole opens in the coating film due to the gas leak as a gas leaking position.

The gas leak locating material before being cured is liquid. Due to the gas leaking pressure, a hole opens in the coating film formed by applying the gas leak locating material. Therefore, it is easy to locate the gas leaking position. Here, the size and shape of the hole that will open may be appropriately adjusted so that it will be easy to repair the hole that will open and the coating film around the hole.

When the gas leak locating material of the present invention is applied at a gas leaking position that has a low gas leaking level, a hole will not open by the gas leak, and it is impossible to locate the gas leaking position. However, in this case, by simply curing the coating film formed of the gas leak locating material applied there, it is possible to repair the gas leaking position.

The method for forming a coating film is not particularly limited and may be appropriately selected in accordance with the intended purpose. Examples of the method include a spin coating method, a slit coating method, a dip coating method, a blade coating method, a bar coating method, a spray method, a letterpress printing method, an intaglio printing method, a screen printing method, a planographic printing method, a dispensing method, and an inkjet method.

The average thickness of a coating film may be appropriately selected in accordance with the gas leaking pressure at the gas leaking position, but is preferably 50 μm or greater and 5,000 μm or less.

<Other Steps>

Other steps are not particularly limited and may be appropriately selected in accordance with the intended purpose. Examples of the other steps include a washing step and a drying step.

It is preferable to perform the gas leak locating step after washing a position suspected to have a gas leak in the washing step.

(Gas Leak Repairing Material)

A gas leak repairing material of the present invention is a version of the gas leak locating material of the present invention that is used for repairing a gas leaking position. The same one as the gas leak locating material of the present invention is used as the gas leak repairing material of the present invention.

With the gas leak repairing material of the present invention, it is unnecessary to locate a gas leaking position beforehand, the working manner is simple, and the working time can be shortened significantly. Moreover, because a cavity in which a leaking gas is gathered is unnecessary, there are advantages that the gas leak repairing material would not readily peel, and that a recurrent gas leak is less likely.

By the simple method of repairing a gas leaking position located by the gas leak locating material of the present invention using the gas leak repairing material of the present invention, it is possible to repair the gas leaking position in a short time even if the gas leaking level is high.

The method by which to repair the gas leaking position using the gas leak repairing material of the present invention can be suitably carried out according to a gas leak repairing method of the present invention described below.

(Gas Leak Repairing Method)

According to a first embodiment, a gas leak repairing method of the present invention includes a curing step and a repairing step and further includes other steps as needed.

<Curing Step>

The curing step is a step of curing a coating film in which a gas leaking position located by the gas leak locating method of the present invention is included.

In the curing step, the coating film has a hole at the gas leaking position located by the gas leak locating method of the present invention due to the gas leaking pressure. Hence, the coating film including this hole is cured, to solidify and immobilize the hole that has opened in the coating film.

Examples of the curing unit include a heating curing unit or a photo-curing unit.

The heating curing unit encompasses a unit configured to heat a repairing target. Examples of the heating curing unit include an infrared heater, a hot air heater, and a heating roller. The heating temperature is not particularly limited, may be appropriately selected in accordance with the intended purpose, and is preferably 50° C. or higher and 200° C. or lower.

Examples of the photo-curing unit include an ultraviolet (UV) irradiation lamp, and an electron beam irradiator. It is preferable that the photo-curing unit be equipped with a mechanism configured to eliminate ozone.

Examples of the kinds of the ultraviolet (UV) irradiation lamp include a high-pressure mercury lamp, an ultrahigh-pressure mercury lamp, and metal halides.

The ultrahigh-pressure mercury lamp is a dot light source. A Deep UV-type ultrahigh-pressure mercury lamp combined with an optical system and enhanced in the light utilization efficiency can irradiate a target with a short wavelength range.

The metal halides have a wide wavelength range and are effective for colored targets. The metal halides are halides of metals such as Pb, Sn, and Fe, which may be selected in accordance with the absorption spectrum of the photo-polymerization initiator. The lamp used for curing is not particularly limited and may be appropriately selected in accordance with the intended purpose. For example, commercially available lamps such as H LAMP, D LAMP, or V LAMP available from Fusion Systems Inc. may be used.

The light with which the coating film is irradiated in the curing step is not particularly limited and may be appropriately selected in accordance with the intended purpose. Ultraviolet rays are preferable, near ultraviolet rays are more preferable, and light having a wavelength of 420 nm or shorter is particularly preferable.

The irradiation time is not particularly limited and may be appropriately selected in accordance with the intended purpose.

<Repairing Step>

The repairing step is a step of closing the cured gas leaking position with the gas leak repairing material of the present invention, and curing the gas leak repairing material.

If curing in the curing step is without a located gas leaking position, there is a cavity or an air pathway inside the gas leak repairing material during repairing. Therefore, it is difficult to repair the gas leaking position, or the repairing reliability is poor. Moreover, a gas leak that may occur again will likely occur from a position different from the first gas leaking position, and having repaired a gas leaking position is not free from a high likelihood of a recurrent gas leak from a different position.

In the present invention, in the curing step, the hole in the coating film by which the gas leaking position is located is closed with the gas leak repairing material and the gas leak repairing material with which the hole is closed is cured, to thereby repair the gas leaking position.

Examples of the closing method using the gas leak repairing material include embedding the gas leaking position with the gas leak repairing material, coating the gas leaking position with the gas leak repairing material, and embedding and coating the gas leaking position with the gas leak repairing material.

For example, the irradiation light, the curing unit, and the curing conditions for curing the gas leak repairing material in the repairing step are the same as those in the curing step described above.

<Other Steps>

The other steps are not particularly limited and may be appropriately selected in accordance with the intended purpose. Examples of the other steps include a washing step and a drying step.

It is preferable to perform the curing step described above after washing a position suspected to have a gas leak in the washing step.

According to a second embodiment, a gas leak repairing method of the present invention includes a step of curing a coating film while disposing a tubular member at a gas leaking position in the coating film in which the gas leaking position, which is located by the gas leak locating method of the present invention, is included and a step of filling the tubular member with the gas leak repairing material of the present invention, subsequently connecting an openable/closable valve in an open state thereof to the tubular member that bores by a gas leaking pressure, and closing the openable/closable valve, and further includes other steps as needed.

(Gas Leak Repairing Device)

A gas leak repairing device of the present invention includes a light source, and a film-shaped member or a tape-shaped member on an emitting side of the light source, the film-shaped member or the tape-shaped member having ultraviolet transmittance. The gas leak repairing material of the present invention is attachable on the film-shaped member or the tape-shaped member.

The gas leak repairing device of the present invention closes a hole (gas leaking position) in a coating film with the gas leak repairing material attached on the surface of the film-shaped member and cures the gas leak repairing material by irradiation with ultraviolet rays. Therefore, the gas leak repairing device can repair the gas leaking position easily in a short time even if the gas leaking level at the gas leaking position is high.

<Light Source>

Examples of the light source include an ultraviolet (UV) irradiation lamp that can emit light having a wavelength of 420 nm or shorter.

<Film-Shaped Member>

The planar shape, size, material, and structure of the film-shaped member are not particularly limited and may be appropriately selected in accordance with the intended purpose so long as the film-shaped member can transmit light having a wavelength of 420 nm or shorter therethrough.

Examples of the planar shape of the film-shaped member include a circular shape, an elliptical shape, a rectangular shape, a square shape, and a rhomboidal shape.

The material of the film-shaped member is not particularly limited and may be appropriately selected in accordance with the intended purpose so long as the film-shaped member can transmit light having a wavelength of 420 nm or shorter therethrough. Examples of the material of the film-shaped member include ultraviolet-transparent resins.

Examples of the ultraviolet-transparent resin include: vinyl-based resins such as polyvinyl chloride and polyvinylidene chloride; polystyrene-based resins such as polystyrene and styrene-acrylonitrile-butadiene copolymers; fluororesins such as tetrafluoro-hexafluoropropylene (FEP) and tetrafluoroethylene perfluoroalkoxyethylene copolymers (PFA); polyethylene-based resins such as ethylene-vinyl acetate copolymers; polyester-based resins such as polyethylene terephthalate (PET); and polypropylene, poly 4-methylpentene, polymethyl methacrylate, polyethylene, cellulose (cellophane), polycarbonate, polyphenylene sulfide, polytetrafluoroethylene (PTFE), polyether ether ketone (PEEK), polyether sulfone (PESU), aramid, polyimide, and triacetate. One of these ultraviolet-transparent resins may be used alone or two or more of these ultraviolet-transparent resins may be used in combination.

It is preferable that the surface of the film-shaped member has releasability. This makes it possible to transfer the gas leak repairing material of the present invention attached on the surface of the film-shaped member to the gas leaking position, and to close the hole (gas leaking position) in the coating film.

Examples of the treatment for imparting releasability include a treatment for minutely recessing or protruding the surface of the film-shaped member, a silicone coating treatment, and a fluorine coating treatment.

<Tape-Shaped Member>

It is preferable to use a tape-shaped member having an adhesive layer on its light source side and releasability on its light exit side (opposite side), because such a tape-shaped member can be fixed on the emitting side of the light source. The releasability can be imparted by the same treatment as that for the film-shaped member described above.

The material of the tape-shaped member is not particularly limited and may be appropriately selected in accordance with the intended purpose so long as the tape-shaped member can transmit light having a wavelength of 420 nm or shorter therethrough. The same ultraviolet-transparent resin as that of the film-shaped member may be used.

Figure 2:
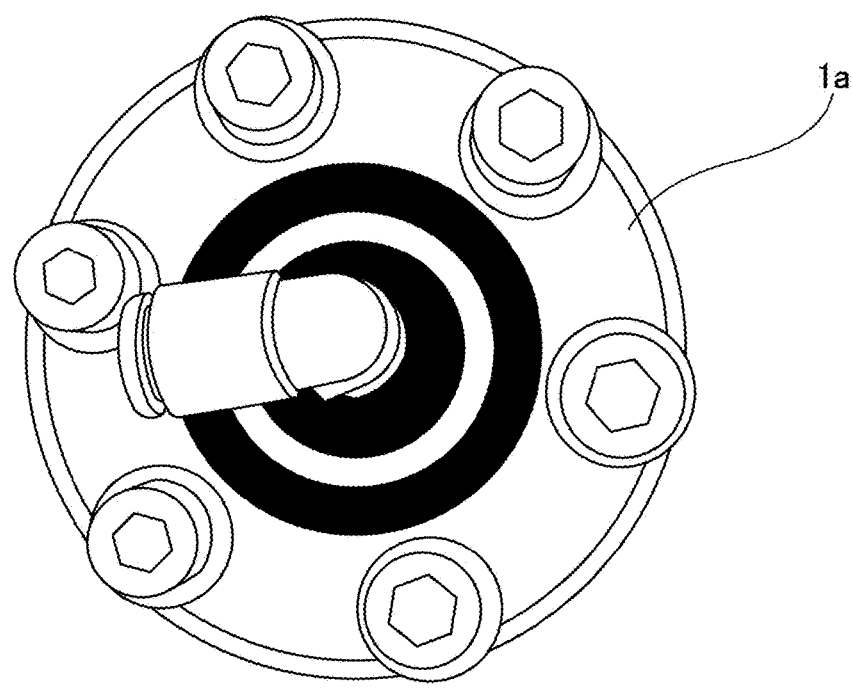
FIG. 2 is an image illustrating an example of a top surface of a closing flange of a gas delivery conduit.
Figure 3:
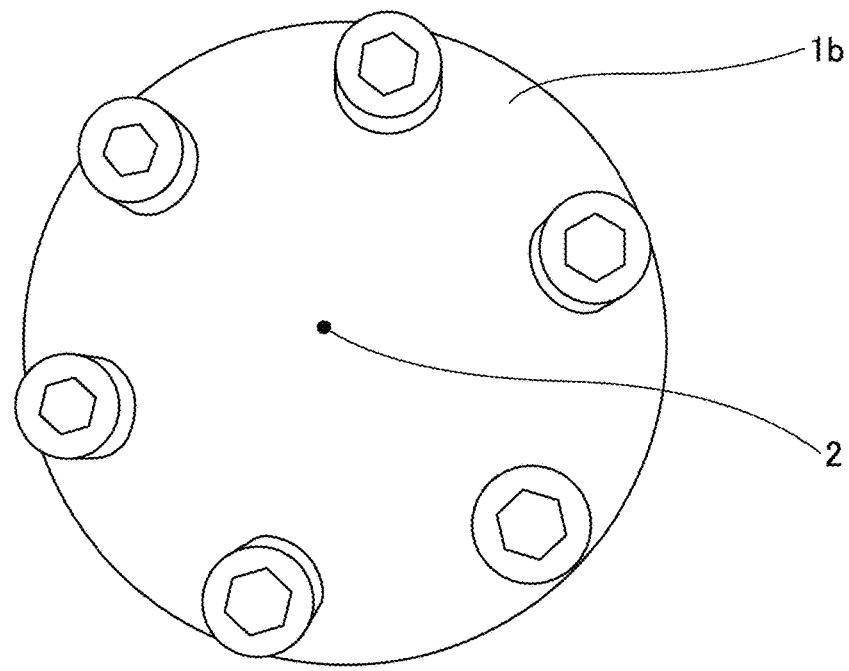
FIG. 3 is an image illustrating an example of a bottom surface of a closing flange of a gas delivery conduit.

FIG. 1 is an image illustrating an example of a gas delivery conduit 1, which is a gas leak repairing target. FIG. 2 is an image illustrating an example of a top surface 1a of a closing flange of the gas delivery conduit. FIG. 3 is an image illustrating an example of a bottom surface 1b of the closing flange of the gas delivery conduit. There is a gas leaking position 2 having a diameter of 1 mm in the bottom surface 1b of the closing flange of the gas delivery conduit illustrated in FIG. 3.

Figure 4:
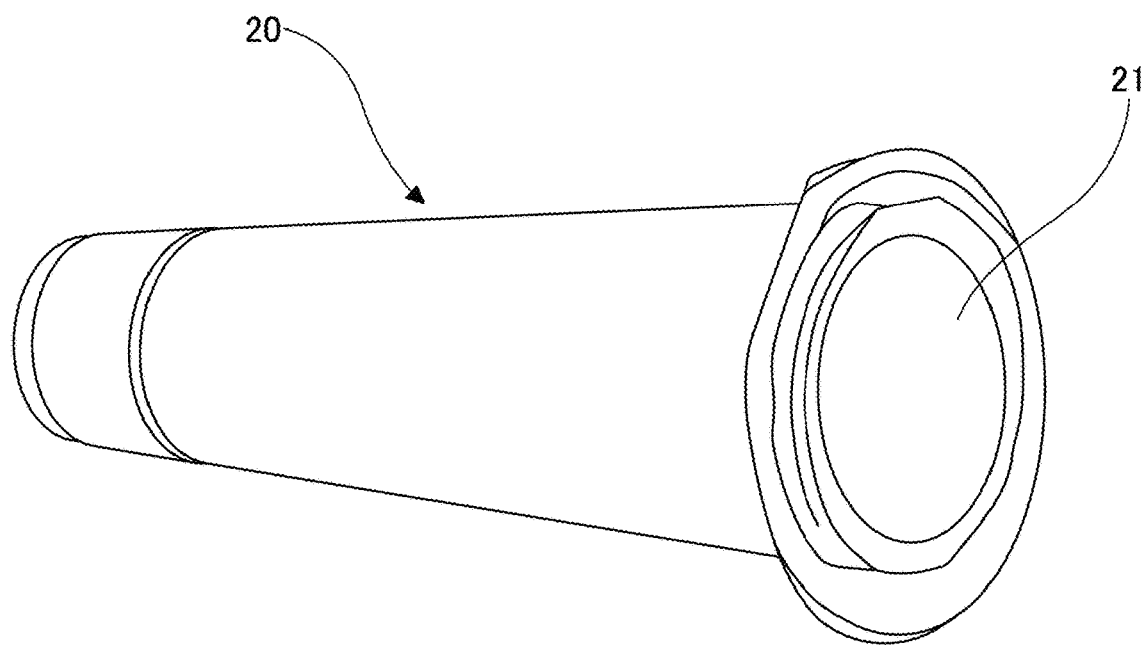
FIG. 4 is an image illustrating an example of a state of a light-emitting side of a gas leak repairing device of the present invention.
Figure 5:
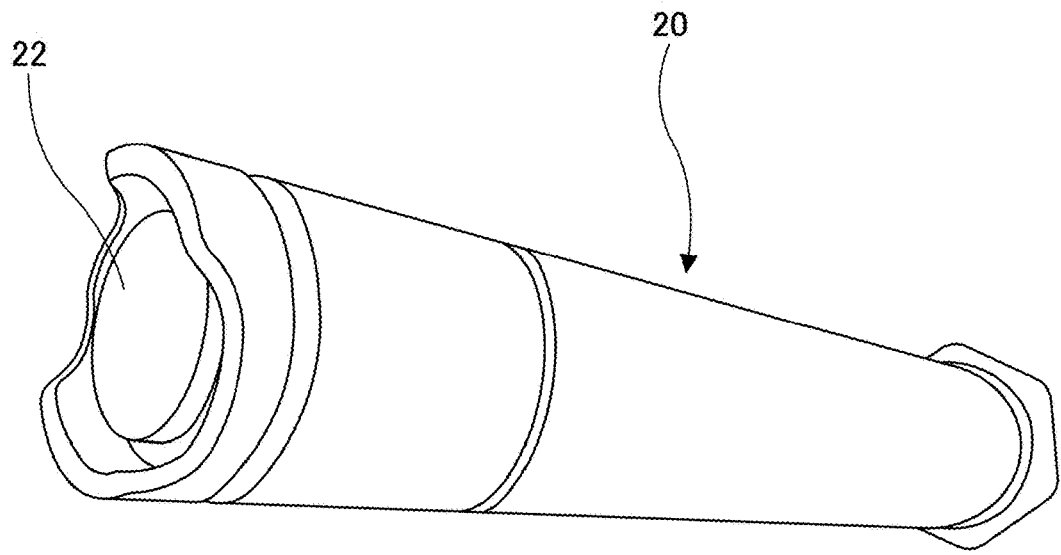
FIG. 5 is an image illustrating an example of a state at a light source side of a gas leak repairing device of the present invention.

FIG. 4 and FIG. 5 are images illustrating examples of the gas leak repairing device of the present invention. The gas leak repairing device 20 illustrated in FIG. 4 and FIG. 5 is a hand-held type. Reference numeral 21 denotes a film-shaped member, and a surface of the film-shaped member 21 has releasability imparted by silicone coating. During repairing, the gas leak repairing material of the present invention attached in a predetermined amount on the surface of the film-shaped member 21 is pressed against a hole (gas leaking position) in a coating film, to be used for repairing the gas leaking position.

Reference numeral 22 denotes a press switch. When the press switch is depressed with a finger, the light source (unillustrated) emits ultraviolet rays through the film-shaped member 21.

The gas leak repairing device of the present invention is configured to repair a gas leaking position by closing a hole (gas leaking position) in a coating film with the gas leak repairing material attached on the surface of the film-shaped member and curing the gas leak repairing material by irradiation with light. Therefore, even if the gas leaking level at the gas leaking position is high, the gas leak repairing device of the present invention can repair the gas leaking position more easily in a shorter time than an existing method using an ultraviolet irradiator separate from a pressing tool.

Here, the embodiments of the gas leak locating method and the gas leak repairing method of the present invention will be described in detail with reference to the drawings.

First Embodiment

Figure 6:
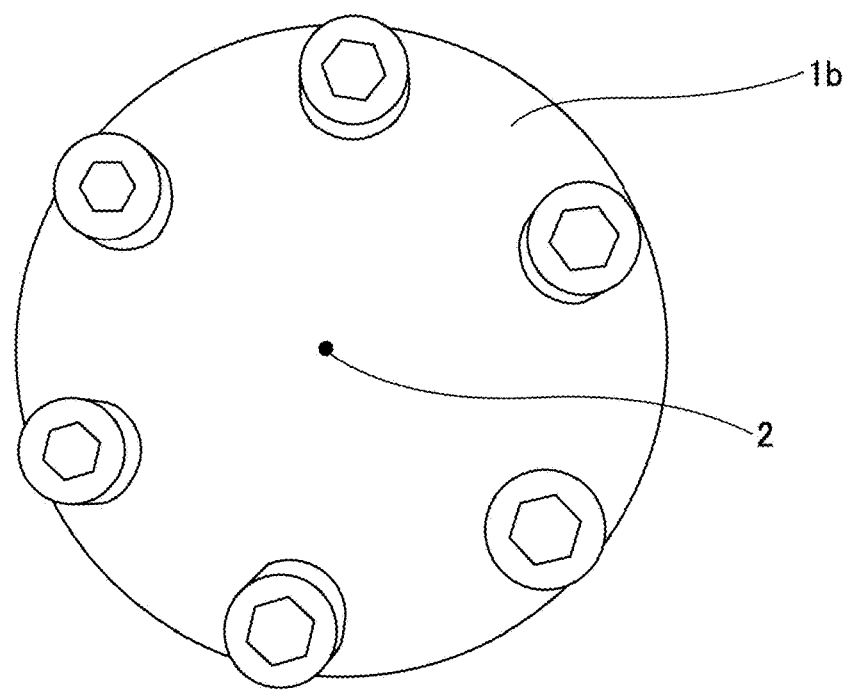
FIG. 6 is an image illustrating an example of a gas leak repairing method according to a first embodiment, and illustrating a state of a gas leaking position before being repaired.

FIG. 6 illustrates an example of the gas leak repairing method according to the first embodiment, illustrating a state of a gas leaking position before being repaired. FIG. 6 is an image illustrating a gas delivery conduit 1 having a closing flange before being repaired, including a gas leaking position 2 having a diameter of 1 mm in a bottom surface 1b.

Figure 7:
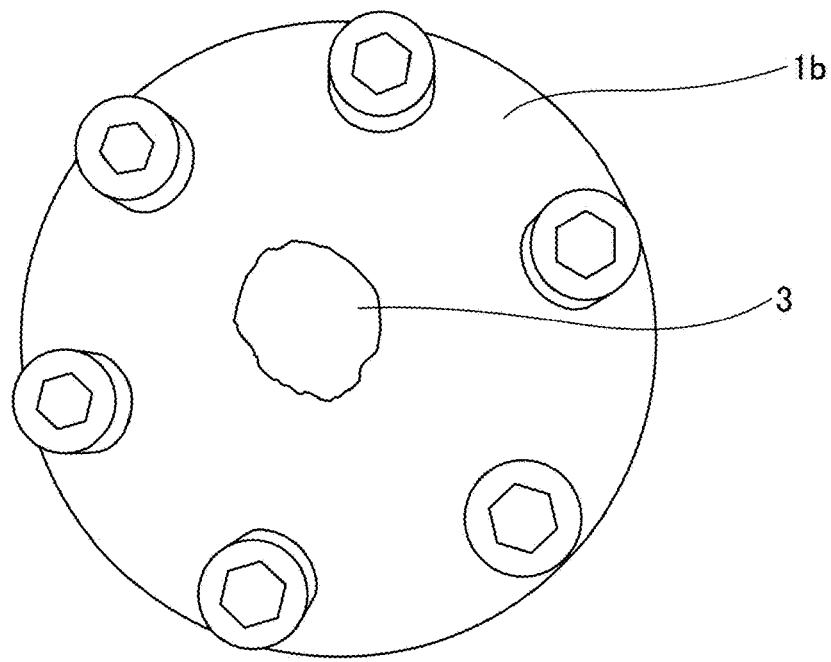
FIG. 7 is an image illustrating an example of a gas leak repairing method according to a first embodiment, and illustrating a state of a gas leak locating material being applied at a position suspected to have a gas leak.

Next, FIG. 7 is an image illustrating a state of the gas leak locating material being applied at a position suspected to have a gas leak, illustrating a state of the gas leak locating material being applied to form a coating film 3 at and around the gas leaking position 2 in the bottom surface 1b of the closing flange of the gas delivery conduit. The gas leak locating material contains a white colorant, and the coating film 3 is white.

Figure 8:
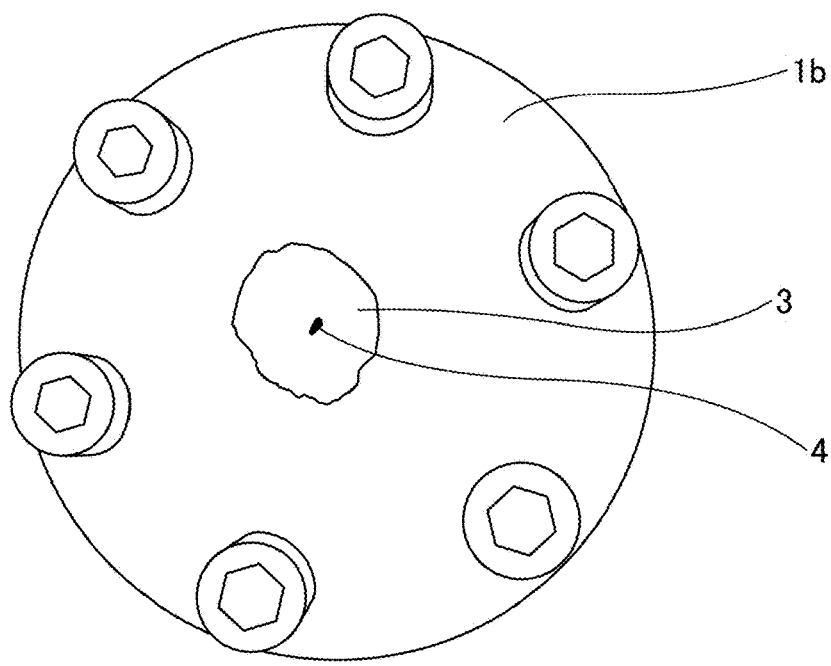
FIG. 8 is an image illustrating an example of a gas leak repairing method according to a first embodiment, and illustrating a state of a hole having been opened in a coating film due to a gas leak.

Next, FIG. 8 is an image illustrating a state of a hole having been opened in the coating film due to a gas leak, illustrating a state of a hole 4 having been opened in the coating film 3 due to the gas leaking pressure at the gas leaking position (gas leak locating step). The hole 4 corresponds to the gas leaking position. Since the coating film 3 is white, it is easy to locate the hole 4.

Figure 9:
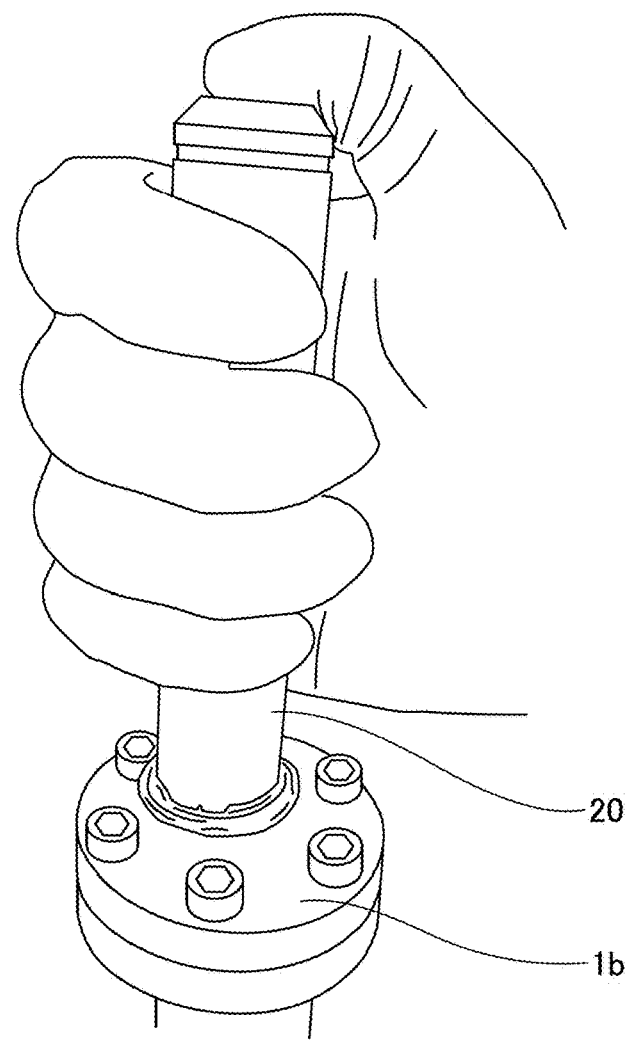
FIG. 9 is an image illustrating an example of a gas leak repairing method according to a first embodiment, and illustrating a state of curing a coating film in which a gas leaking position is included.

Next, FIG. 9 is an image illustrating a state of curing the coating film in which the gas leaking position is included, illustrating a state of curing the coating film 3, in which the hole 4 has opened, by irradiation with ultraviolet rays using the gas leak repairing device 20 of the present invention. As a result, the hole 4, which is the located gas leaking position, and the coating film 3, in which the hole has opened, cure, and the hole is solidified and immobilized (curing step).

Figure 10:
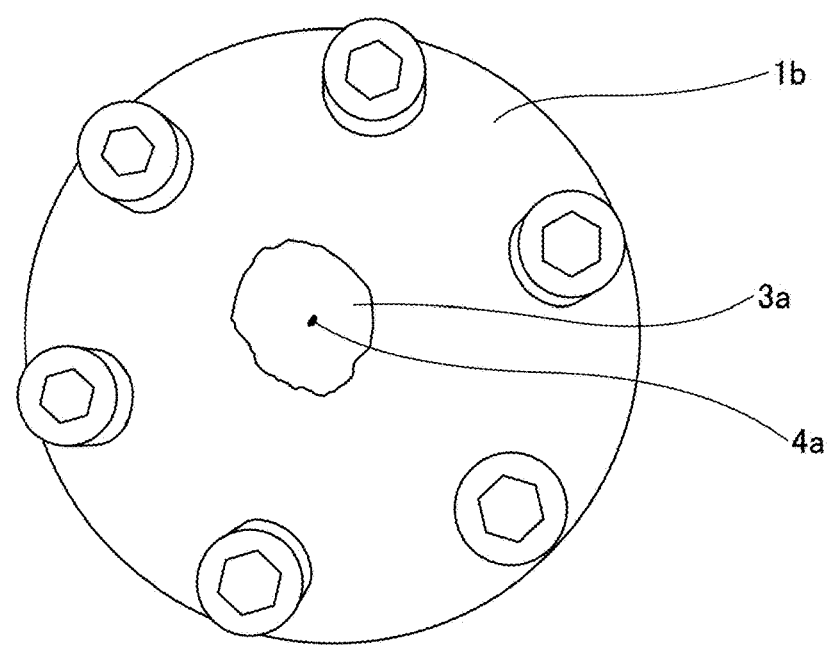
FIG. 10 is an image illustrating an example of a gas leak repairing method according to a first embodiment, and illustrating a state of a gas leaking position that has cured.

Next, FIG. 10 is an image illustrating a state of the gas leaking position cured, illustrating the cured coating film 3a including the cured hole 4a.

Figure 11:
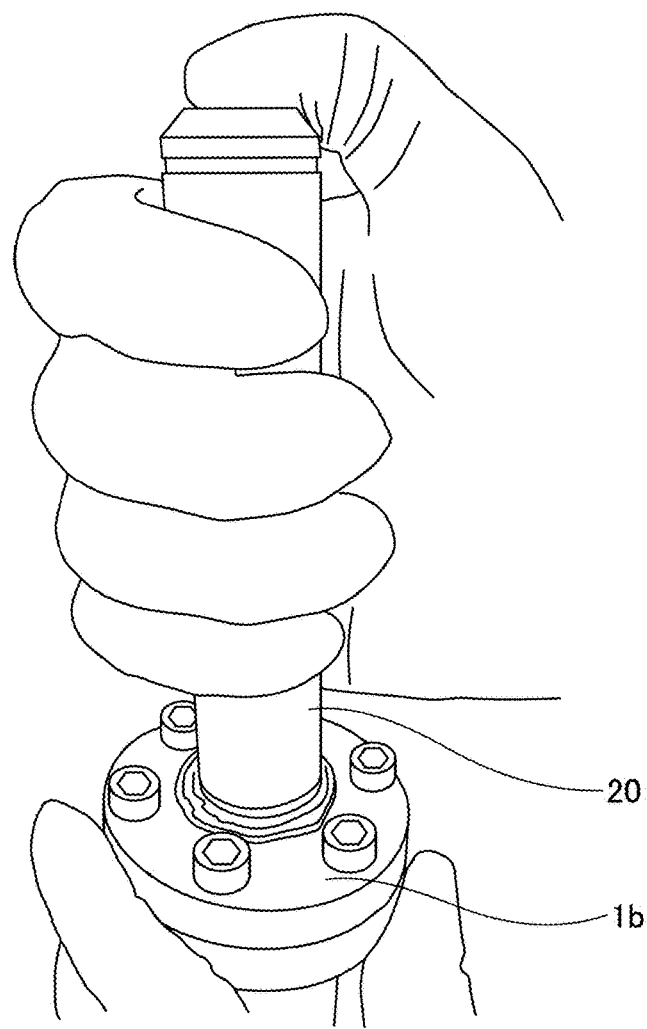
FIG. 11 is an image illustrating an example of a gas leak repairing method according to a first embodiment, and illustrating a state of closing a gas leaking position with a gas leak repairing material and curing the gas leak repairing material.

Next, FIG. 11 is an image illustrating a state of closing the gas leaking position with the gas leak repairing material and curing the gas leak repairing material, illustrating a state of closing the cured hole 4a with the gas leak repairing material and curing the gas leak repairing material by irradiation with ultraviolet rays using the gas leak repairing device 20 of the present invention (repairing step).

Figure 12:
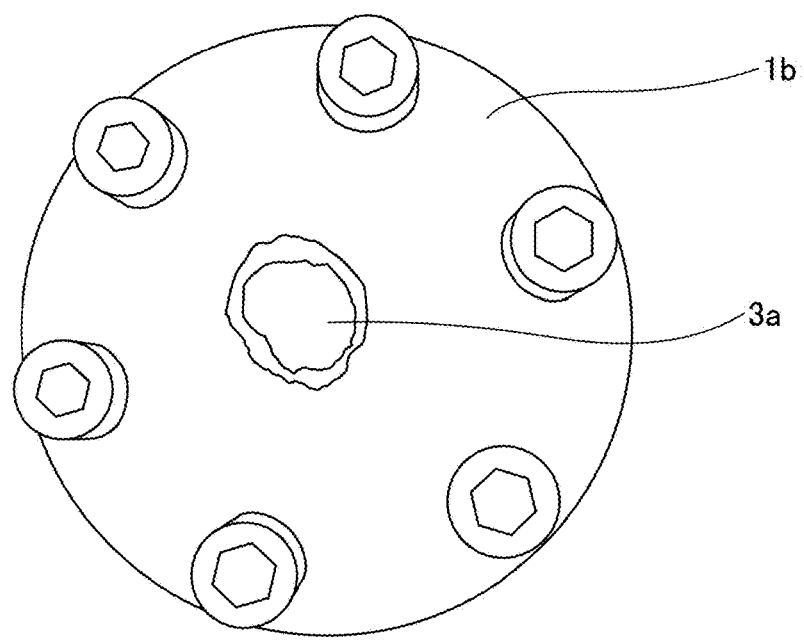
FIG. 12 is an image illustrating an example of a gas leak repairing method according to a first embodiment, and illustrating a state of gas leaking position repairing having been completed.

Finally, FIG. 12 is an image illustrating a state of repairing of the gas leaking position having been completed, illustrating a state of the hole having been closed and repairing of the gas leaking position having been completed.

Second Embodiment

The second embodiment is a method of applying the gas leak locating material of the present invention at a position to be repaired, to form a coating film, setting a tubular member at the position of the coating film to be repaired, curing the coating film by irradiation with ultraviolet rays, subsequently filling the tubular member with the gas leak repairing material of the present invention to let a hole be formed in the tubular member by the gas leaking pressure, and subsequently connecting an openable/closable valve in its open state to the tubular member and closing the openable/closable valve, to thereby repair the gas leaking position.

—Gas Leak Locating Method—

There are the following two gas leak locating methods A and B.

Figure 13:
FIG. 13 is an image illustrating an example of a gas leak locating method according to a second embodiment, and illustrating a gas leaking position.
Figure 14:
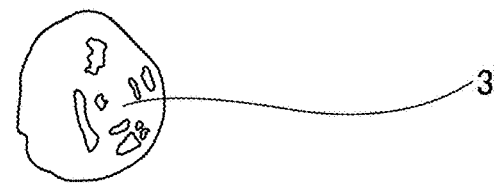
FIG. 14 is an image illustrating an example of a gas leak locating method according to a second embodiment, and illustrating a state of a gas leak locating material being applied at a gas leaking position.
Figure 15:
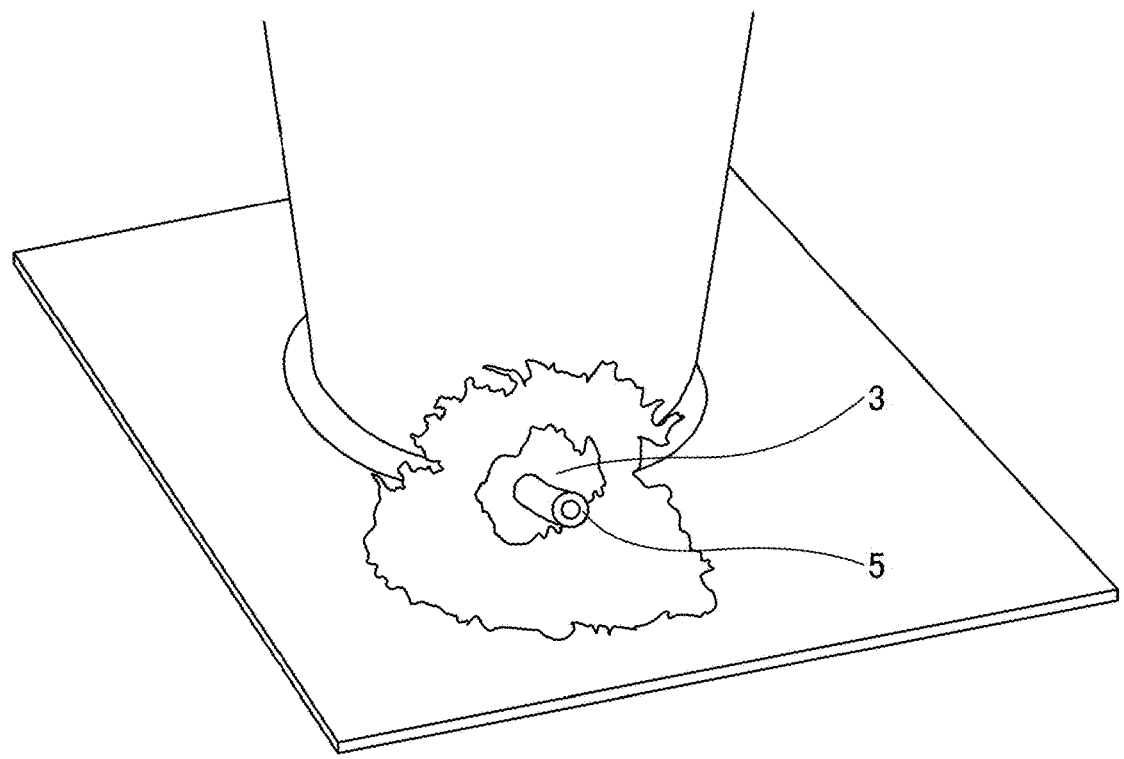
FIG. 15 is an image illustrating an example of a gas leak locating method according to a second embodiment, and illustrating a state of a tube being disposed at a gas leaking position.

In the method A, when the gas leak locating material 3 of the present invention is applied (see FIG. 14) at a gas leaking position 2 illustrated in FIG. 13, a hole opens in a coating film formed of the gas leak locating material 3 due to the gas leaking pressure. A tube 5 serving as the tubular member is pressed against the hole roughly by the center of the inner diameter of the tube 5 (see FIG. 15). If there is any gap left where the tube 5 is pressed, the gas leak locating material 3 is additionally formed there as needed. Subsequently, the coating film is cured by irradiation with ultraviolet rays, to fix the tube. Through these steps, the gas leaking position is located. The tubular member is not particularly limited and may be appropriately selected in accordance with the intended purpose. Examples of the tubular member include a urethane tube. The gas leak locating material 3 of the present invention has a thixotropy ratio (A/B) of 21.0 or higher.

Figure 16:
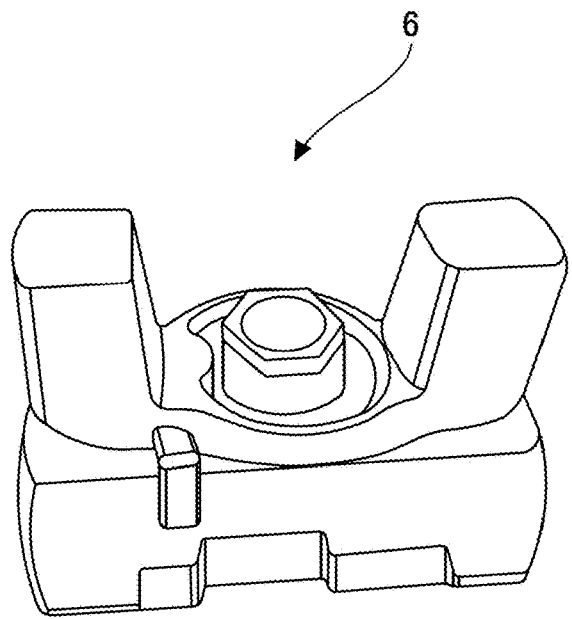
FIG. 16 is an image illustrating an example of an openable/closable valve used in a gas leak locating method according to a second embodiment.

It is also possible to connect an openable/closable valve 6 as illustrated in FIG. 16 to the gas leaking position 2 directly with the gas leak locating material 3 without using the tubular member. The shape and material of the openable/closable valve 6 are not particularly limited and may be appropriately selected in accordance with the intended purpose so long as the openable/closable valve 6 is an air valve. Examples of the openable/closable valve 6 include a ball valve, a hand valve, a solenoid valve, and a tube valve.

Even if the hole (gas leaking position) in the coating film formed of the gas leak locating material 3 is larger than the inner diameter or the outer diameter of the tube 5, it is possible to locate the gas leaking position by additionally forming the gas leak locating material 3 at any gap that is left where the tube is pressed to see to it that the gas will leak only through the tube, and then curing the coating film to fix the tube.

In the method B, the tube 5 to which the gas leak locating material 3 is applied at the opening and that is filled with the gas leak locating material 3 inside is pressed against the gas leaking position 2. As a result, a hole opens in the gas leak locating material 3 with which the tube is filled due to the gas leaking pressure. Then, the inside and the outside of the tube 5 are cured to fix the tube at the gas leaking position 2. The method B may be used in combination with the method A.

—Gas Leak Repairing Method—

Figure 17:
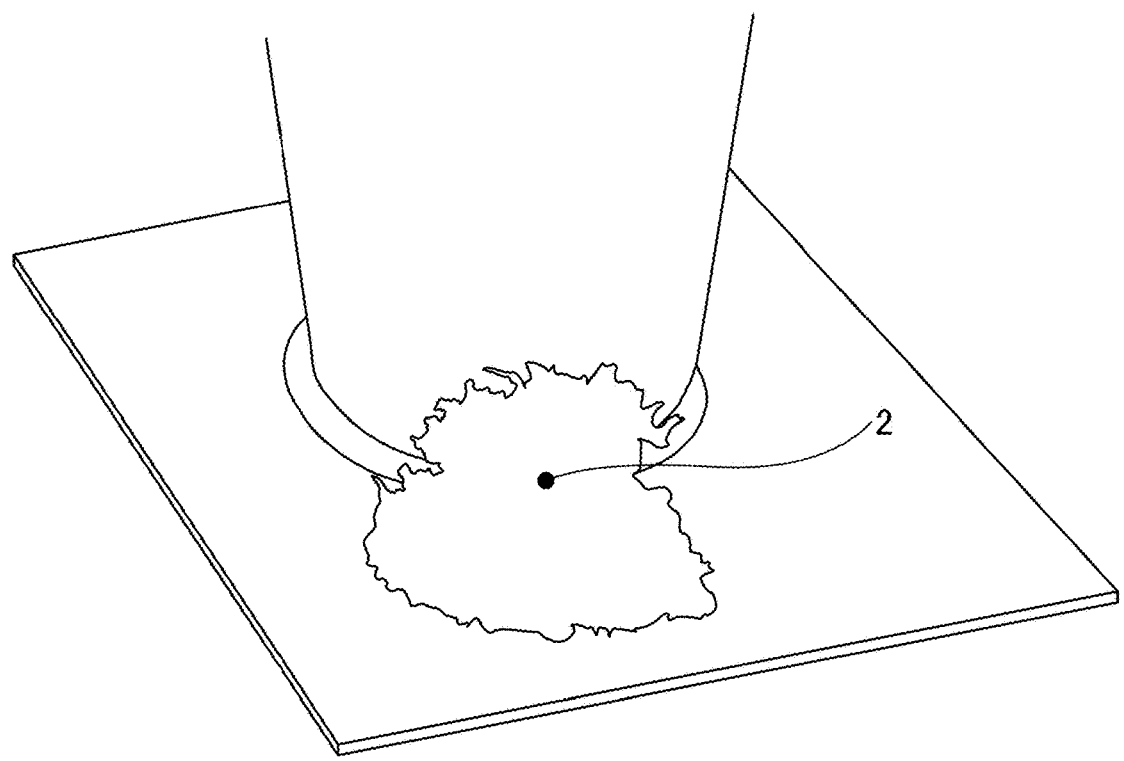
FIG. 17 is an image illustrating an example of a gas leak repairing method according to a second embodiment, and illustrating a gas leaking position.

(1) As illustrated in FIG. 17, a hole (gas leaking position 2) having a diameter of 10 mm has opened in a welded portion, and a gas is spouting from the gas leaking position 2 due to an internal pressure of 0.8 MPa applied by a compressor.

Figure 18:
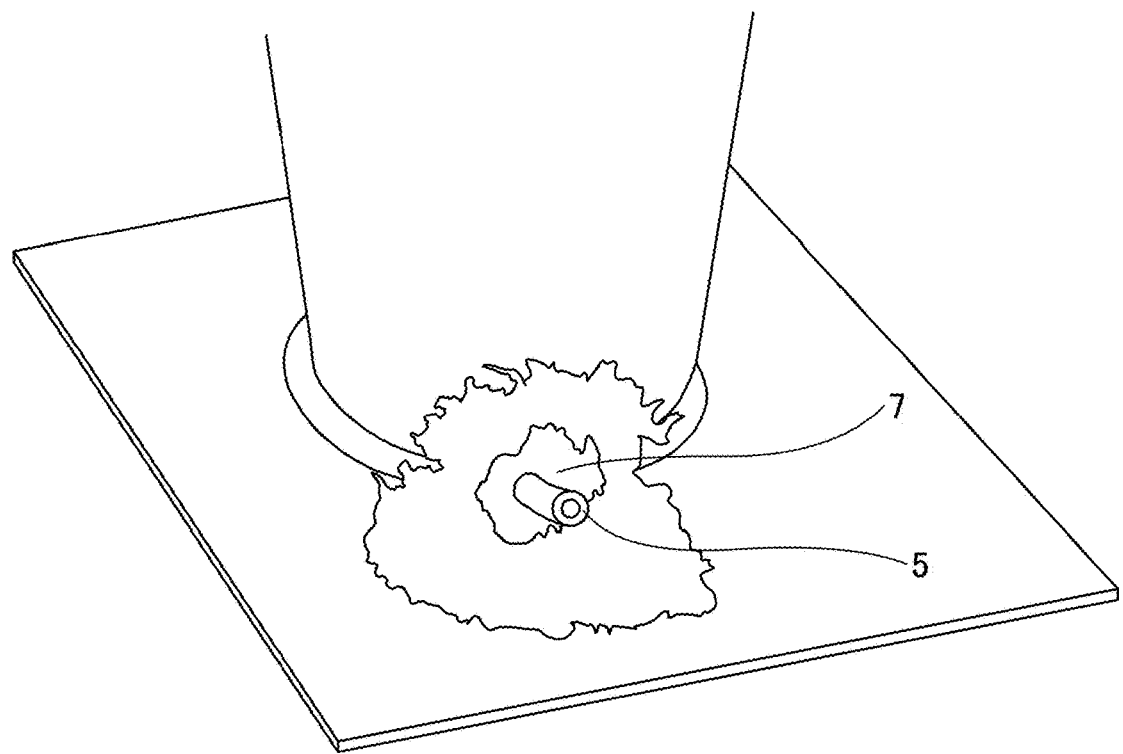
FIG. 18 is an image illustrating an example of a gas leak repairing method according to a second embodiment, and illustrating a state of a tube being disposed at a gas leaking position.

(2) As illustrated in FIG. 18, a gas leak repairing material 7 of the present invention is applied at the gas leaking position 2 to form a coating film, and the coating film is cured by irradiation with ultraviolet rays with a polyurethane tube 5 (with an outer diameter of 6 mm and an inner diameter of 4 mm, available from Nihon Pisco Co Ltd.) serving as the tubular member disposed at the position of the coating film to be repaired. The gas leak repairing material 7 of the present invention has a thixotropy ratio (A/B) of 21.0 or higher.

Figure 19:
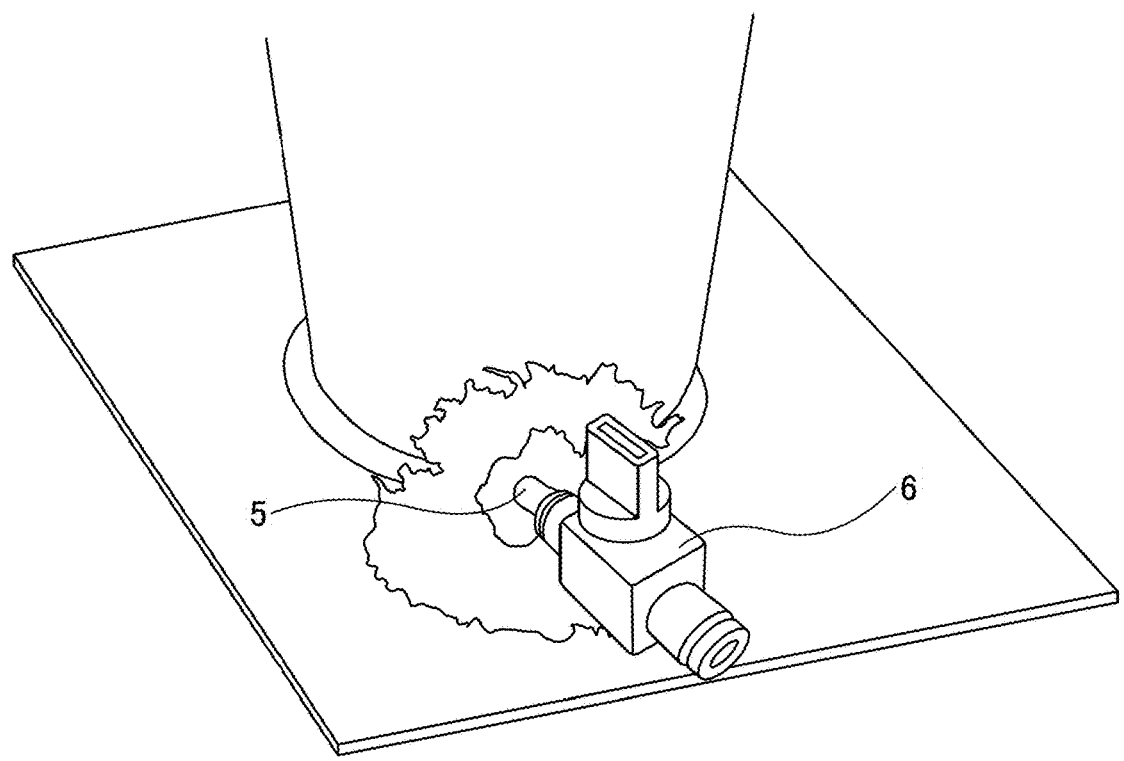
FIG. 19 is an image illustrating an example of a gas leak repairing method according to a second embodiment, and illustrating a state of an openable/closable valve being connected to a tube.

(3) As illustrated in FIG. 19, an openable/closable valve 6 (available from Nihon Pisco Co Ltd., a shutoff valve HAND VALVE UNION STRAIGHT) is connected in its open state to the tube 5.

Figure 20:
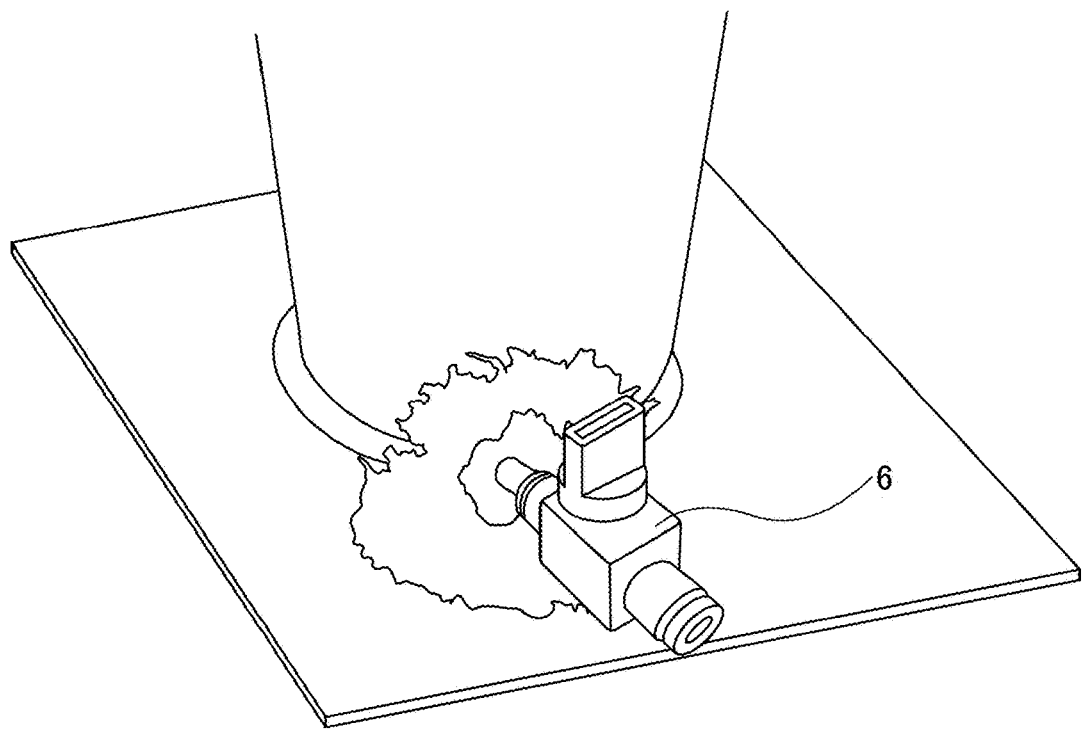
FIG. 20 is an image illustrating an example of a gas leak repairing method according to a second embodiment, and illustrating a state of an openable/closable valve being switched closed.
Figure 21:
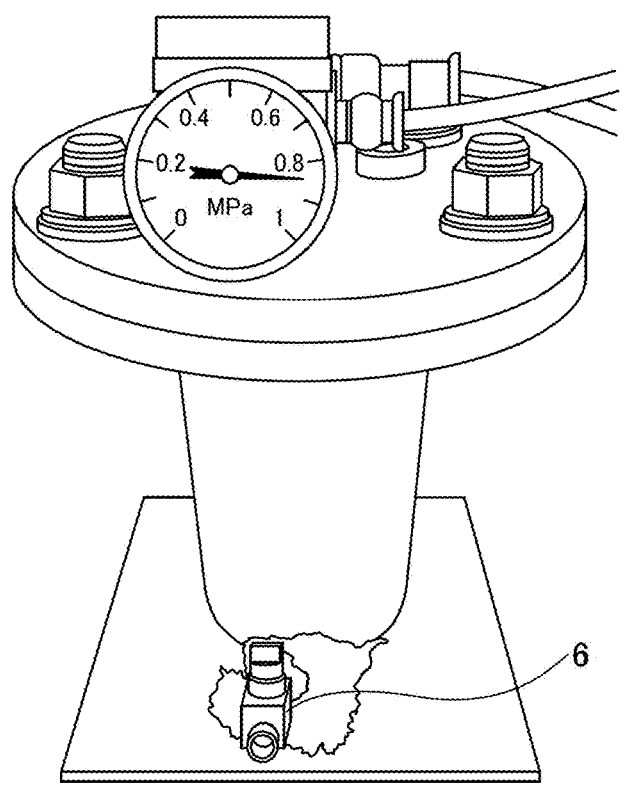
FIG. 21 is an image illustrating an example of a gas leak repairing method according to a second embodiment, and illustrating a state of gas leaking position repairing having been completed.

(4) As illustrated in FIG. 20, the openable/closable valve 6 is closed to stop the gas leak (see FIG. 21). Through these steps, repairing of the gas leaking position is completed.

<Use>

By using the gas leak locating material of the present invention in the gas leak locating method of the present invention, it is possible to locate a gas leaking position easily with a simple action of applying the gas leak locating material at a position suspected to have a gas leak.

By using the gas leak repairing material of the present invention in the gas leak repairing method of the present invention, it becomes unnecessary to locate a gas leaking position beforehand, and it is possible to repair the gas leaking position easily in a short time even if the gas leaking level at the gas leaking position is high. Hence, the gas leak repairing material can be suitably used for repairing, for example, gas delivery conduits, gas sealing devices, gas insulated systems, and communication cables such as optical cables.

EXAMPLES

The present invention will be described below by way of Examples. The present invention should not be construed as being limited to these Examples.

Examples 1 to 15 and Comparative Examples 1 to 5

<Production of Gas Leak Locating Material>

Gas leak locating materials were prepared according to the compositions and contents presented in Table 1 to Table 3. Specifically, the binder components and the additives presented in Table 1 to Table 3 were mixed, and subsequently stirred until solid components dissolved. The unit of the contents presented in Table 1 to Table 3 is part by mass.

Next, various properties of each obtained gas leak locating material were evaluated in the manners described below. The results are presented in Table 1 to Table 3.

<Measurement of Viscosity>

The viscosity of each gas leak locating material was measured using AR-G2 obtained from TA Instruments Japan Inc. Specifically, using a cone plate having a diameter of 20 mm and an angle of 2°, the viscosity was measured in an environment at a temperature of 25° C. in a shear rate (shear speed) range of from 0.01 $s^{-1}$ through 100 $s^{-1}$. Viscosity values at a shear rate of 0.1 $s^{-1}$ were evaluated. A ratio (A/B) of the viscosity A at 25° C. at a shear rate of 0.1 $s^{-1}$ to the viscosity B at 25° C. at a shear rate of 10 $s^{-1}$ was defined as the thixotropy ratio.

<Measurement of Elastic Modulus>

Each gas leak locating material was applied using a bar coater to have an average thickness of 1 mm on a polyester film having releasability, and cured using a UV light U1 obtained from JAXMAN. The elastic modulus E' of the gas leak locating material at 50° C. after being cured was measured by temperature sweep in a range of from 25° C. through 100° C. in a tensile mode at a frequency of 10 Hz at a temperature elevation rate of 10° C./min using RSAIII obtained from TA Instruments Japan Inc.

<Hole Formability in Coating Film>

Using a brush, each gas leak locating material was applied to have a thickness of 1 mm at a gas leaking position having a diameter of 1 mm formed in a bottom surface 1b of a closing flange of a gas delivery conduit illustrated in FIG. 3, to form a coating film. Based on the opening degree of a hole in the coating film, hole formability in the coating film was evaluated according to the criteria described below.

[Evaluation Criteria]

A: The coating film was maintained with a thickness of 0.2 mm or greater, and a hole was open at the gas leaking position.

C: No hole opened at the gas leaking position, and the leaking gas escaped from the coating interface of the coating film or the coating film was maintained with a thickness of only less than 0.2 mm.

<Gas Leak Sealing Property>

With an air pressure applied to a gas delivery conduit illustrated in FIG. 3 so that a pressure of 0.1 MPa would be applied to the gas delivery conduit having a gas leaking position having a diameter of 1 mm in a bottom surface 1b of a closing flange thereof, each gas leak locating material was applied to have a thickness of 1 mm at the gas leaking position of the closing flange using a brush, to form a coating film. The coating film including a hole (gas leaking position) formed by the gas leaking pressure was cured by irradiation with ultraviolet rays. The cured gas leaking position was closed with the gas leak repairing material, and the gas leak repairing material was cured by irradiation with ultraviolet rays, to repair the gas leaking position. Subsequently, the gas leaking condition at the gas leaking position was evaluated according to the gas leak sealing property evaluation criteria described below. The grades B and A are practicable levels.

[Evaluation Criteria]

A: No gas leak occurred in 1 hour or more.

B: A gas leak occurred in 1 minute or more and less than 1 hour.

C: A gas leak occurred in less than 1 minute (i.e., a gas leak occurred immediately).

<Gas Leak Sealing Property with Openable/Closable Valve>

As illustrated in FIG. 17 to FIG. 21, each gas leak locating material was applied to have a thickness of 1 mm at the gas leaking position using a brush, to form a coating film. The coating film was cured by irradiation with ultraviolet rays with a polyurethane tube 5 (with an outer diameter of 6 mm and an inner diameter of 4 mm, obtained from Nihon Pisco Co Ltd.) disposed at the gas leaking position in the coating film. Subsequently, the tube was filled with each gas leak repairing material, to let a hole be formed in the tubular member by the gas leaking pressure. Subsequently, an openable/closable valve 6 (obtained from Nihon Pisco Co Ltd., a shutoff valve HAND VALVE UNION STRAIGHT) was connected in its open state to the tube, and then closed, to repair the gas leaking position. Subsequently, the gas leaking condition at the gas leaking position was evaluated according to the criteria described below. The grades B and A are practicable levels.

[Evaluation Criteria]

A: No gas leak occurred in 1 hour or more.

B: A gas leak occurred in 1 minute or more and less than 1 hour.

C: A gas leak occurred in less than 1 minute (i.e., a gas leak occurred immediately).

TABLE 1

|  |  |  | Ex. | | | | | | |
|---|---|---|---|---|---|---|---|---|---|
|  |  |  | 1 | 2 | 3 | 4 | 5 | 6 | 7 |
| Binder components | IBXA | Isobornyl acrylate | 10 | 10 | 10 | 10 | 10 | 10 | 10 |
|  | ISTA | Isostearyl acrylate |  |  |  |  |  |  |  |
|  | 4HBA | 4-Hydroxybutyl acrylate |  |  |  |  |  |  |  |
|  | HDDA | 1,6-Hexanediol diacrylate |  |  |  |  |  |  |  |
|  | M100 | 3,4-Epoxycyclohexyl methyl methacrylate |  |  |  |  |  |  |  |
|  | IRG1173 | Photo radical generator | 0.1 | 0.1 | 0.1 |  | 0.1 | 0.1 | 0.1 |
|  | IRG819 | Photo radical generator | 0.1 | 0.1 |  | 0.1 | 0.1 | 0.1 | 0.1 |
|  | PI2074 | Photoacid generator |  |  |  |  |  |  |  |
|  | DETX-S | Sensitizer |  |  |  |  |  |  |  |
| Total of binder components (part by mass) |  |  | 7 | 6 | 6 | 6 | 5 | 10 | 1.5 |
| Additives | P4 | Talc | 3 | 4 | 4 | 4 |  |  |  |
|  | PP5WJ | Polypropylene |  |  |  |  | 5 |  |  |
|  | AS200 | Nano silica |  |  |  |  |  | 0.105 |  |
|  | GS-64(LV) | Silica |  |  |  |  |  |  | 8.5 |
|  | SEPTON 4033 | SEEPS |  |  |  |  |  |  |  |
| Total of additives (part by mass) |  |  | 3 | 4 | 4 | 4 | 5 | 0.105 | 8.5 |
| Evaluation result | | Viscosity A (Pa·s) at 25° C. at shear rate of 0.1 s$^{-1}$ | 900 | 27,500 | 28,000 | 27,000 | 80,000 | 15,000 | 520 |
| | | Viscosity B (Pa·s) at 25°C at shear rate of 10 s$^{-1}$ | 8 | 160 | 165 | 155 | 76 | 160 | 20 |
| | | Thixotropy ratio (A/B) | 112.5 | 171.9 | 169.7 | 174.2 | 1,052.6 | 93.8 | 26.0 |
| | | Elastic modulus E' (MPa) at 50° C. after being cured | 1,120 | 1,200 | 1,140 | 1,050 | 753 | 1,000 | 2,000 |
| | | Hole formability in coating film | A | A | A | A | A | A | A |

TABLE 1-continued

|  |  | Ex. | | | | | | |
| --- | --- | --- | --- | --- | --- | --- | --- | --- |
|  |  | 1 | 2 | 3 | 4 | 5 | 6 | 7 |
|  | Gas leak sealing property | A | A | A | A | A | A | A |
|  | Gas leak sealing property with openable/closable valve | A | A | A | A | A | A | A |

TABLE 2

|  |  |  | Ex. | | | | | | |
| --- | --- | --- | --- | --- | --- | --- | --- | --- | --- |
|  |  |  | 8 | 9 | 10 | 11 | 12 | 13 | 14 |
| Binder components | IBXA | Isobornyl acrylate |  | 1 | 3 |  |  |  | 10 |
|  | ISTA | Isostearyl acrylate | 9.9 | 9 | 7 |  |  |  |  |
|  | 4HBA | 4-Hydroxybutyl acrylate |  |  |  | 10 |  |  |  |
|  | HDDA | 1,6-Hexanediol diacrylate | 0.1 |  |  |  | 10 |  |  |
|  | M100 | 3,4-Epoxycyclohexyl methyl methacrylate |  |  |  |  |  | 10 |  |
|  | IRG1173 | Photo radical generator | 0.1 | 0.1 | 0.1 | 0.1 | 0.1 | 0.1 | 0.1 |
|  | IRG819 | Photo radical generator | 0.1 | 0.1 | 0.1 | 0.1 | 0.1 |  | 0.1 |
|  | PI2074 | Photoacid generator |  |  |  |  |  | 0.1 |  |
|  | DETX-S | Sensitizer |  |  |  |  |  | 0.005 |  |
|  | Total of binder components (part by mass) |  | 5 | 5 | 5 | 5 | 5 | 5 | 1.2 |
| Additives | P4 | Talc | 5 | 5 | 5 | 5 | 5 | 5 |  |
|  | PP5WJ | Polypropylene |  |  |  |  |  |  |  |
|  | AS200 | Nano silica |  |  |  |  |  |  |  |
|  | GS-64(LV) | Silica |  |  |  |  |  |  | 8.8 |
|  | SEPTON 4033 | SEEPS |  |  |  |  |  |  |  |
|  | Total of additives (part by mass) |  | 5 | 5 | 5 | 5 | 5 | 5 | 8.8 |
| Evaluation result | Viscosity A (Pa · s) at 25° C. at shear rate of 0.1 s$^{-1}$ |  | 206,700 | 189,400 | 185,000 | 140,000 | 180,000 | 180,000 | 550 |
|  | Viscosity B (Pa · s) at 25° C. at shear rate of 10 s$^{-1}$ |  | 1,900 | 1,900 | 1,850 | 1,600 | 1,700 | 1,700 | 26 |
|  | Thixotropy ratio (A/B) |  | 108.8 | 99.7 | 100.0 | 87.5 | 105.9 | 105.9 | 21.2 |
|  | Elastic modulus E' (MPa) at 50° C. after being cured |  | 17 | 14 | 25 | 10 | 3,020 | 3,020 | 2,000 |
|  | Hole formability in coating film |  | A | A | A | A | A | A | A |
|  | Gas leak sealing property |  | B | B | A | B | A | A | B |
|  | Gas leak sealing property with openable/closable valve |  | B | B | A | B | A | A | B |

TABLE 3

| | | | Ex. | Comp. Ex. | | | | |
|---|---|---|---|---|---|---|---|---|
| | | | 15 | 1 | 2 | 3 | 4 | 5 |
| Binder components | IBXA | Isobornyl acrylate | 10 | 10 | 10 | | | 10 |
| | ISTA | Isostearyl acrylate | | | | 10 | | |
| | 4HBA | 4-Hydroxybutyl acrylate | | | | | 10 | |
| | HDDA | 1,6-Hexanediol diacrylate | | | | | | |
| | M100 | 3,4-Epoxycyclohexyl methyl methacrylate | | | | | | |
| | IRG1173 | Photo radical generator | 0.1 | 0.1 | 0.1 | 0.1 | 0.1 | 0.1 |
| | IRG819 | Photo radical generator | 0.1 | 0.1 | 0.1 | 0.1 | 0.1 | 0.1 |
| | PI2074 | Photoacid generator | | | | | | |
| | DETX-S | Sensitizer | | | | | | |
| | Total of binder components (part by mass) | | 1.3 | 8 | 6 | 5 | 6 | 7 |
| Additives | P4 | Talc | | 2 | | 5 | 4 | |
| | PP5WJ | Polypropylene | | | 4 | | | |
| | AS200 | Nano silica | | | | | | |
| | GS-64(LV) | Silica | 8.7 | | | | | |
| | SEPTON 4033 | SEEPS | | | | | | 3 |
| | Total of additives (part by mass) | | 8.7 | 2 | 4 | 5 | 4 | 3 |
| Evaluation result | | Viscosity A (Pa · s) at 25° C. at shear rate of 0.1 s$^{-1}$ | 480 | 17 | 7 | 180,000 | 1,400 | 25,000 |
| | | Viscosity B (Pa · s) at 25° C. at shear rate of 10 s$^{-1}$ | 22 | 1 | 1 | 1,600 | 28 | 1,200 |
| | | Thixotropy ratio (A/B) | 21.8 | 17.0 | 7.6 | 112.5 | 50.0 | 20.8 |
| | | Elastic modulus E' (MPa) at 50° C. after being cured | 1,500 | 1,050 | 700 | 9 | 5 | 1,500 |
| | | Hole formability in coating film | A | C | C | A | A | C |
| | | Gas leak sealing property | B | C | C | C | C | A |
| | | Gas leak sealing property with openable/closable valve | A | C | C | C | C | A |

The details of the components presented in Table 1 to Table 3 are as follows.

<Polymerizable Compound>
 IBXA: Isobornyl acrylate (obtained from Osaka Organic Chemical Industry Ltd.)
 ISTA: Isostearyl acrylate (obtained from Osaka Organic Chemical Industry Ltd.)
 4HBA: 4-Hydroxybutyl acrylate (obtained from Osaka Organic Chemical Industry Ltd.)
 HDDA: 1,6-Hexanediol diacrylate (obtained from Osaka Organic Chemical Industry Ltd.)
 M100: 3,4-Epoxycyclohexyl methyl methacrylate (obtained from Daicel Corporation)

<Polymerization Initiator>
 IRG1173: Photo radical generator (obtained from ISM Resins B.V.)
 IRG819: Photo radical generator (obtained from IGM Resins B.V.)

<Photoacid Generator>
 PI2074: Photoacid generator (obtained from Rhodia Japan Co., Ltd.)

<Sensitizer>
 DETX-S: Sensitizer (obtained from Nippon Kayaku Co., Ltd.)

<Additives>
 P4: Talc (obtained from Nippon Talc Co., Ltd.)
 PP5WJ: Polypropylene (obtained from Seishin Enterprise Co., Ltd.)
 AS200: Nano silica (obtained from Nippon Aerosil Co., Ltd.)
 GS-64 (LV): Silica (obtained from Tatsumori Ltd.)
 SEPTON 4033: SEEPS (hydrogenated styrene-based thermoplastic elastomer, obtained from Kuraray Co., Ltd.)

REFERENCE SIGNS LIST

1: Gas delivery conduit
1a: Top surface of closing flange of gas delivery conduit
1b: Bottom surface of closing flange of gas delivery conduit
2: Gas leaking position
3: Gas leak locating material
4: Hole having opened in coating film 5: Tubular member (tube)
6: Openable/closable valve
7: Gas leak repairing material
20: Gas leak repairing device

The invention claimed is:

1. A gas leak locating material used for locating a gas leaking position by application of the gas leak locating material at a position suspected to have a gas leak, wherein
the gas leak locating material contains a curable resin composition containing a polymerizable compound and a polymerization initiator,
the gas leak locating material satisfies a formula: $A/B \geq 21.0$, where A represents a viscosity (Pa·s) of the gas leak locating material at 25° C. at a shear rate of $0.1~s^{-1}$ and B represents a viscosity (Pa·s) of the gas leak locating material at 25° C. at a shear rate of $10~s^{-1}$, and
the gas leak locating material has an elastic modulus E' of 10 MPa or higher at 50° C. after being cured, where the elastic modulus E' is determined by performing a temperature sweep using a rheometer in tensile mode at a frequency of 10 Hz, with a temperature elevation rate of 10° C./min, over a temperature range from 25° C. through 100° C., on a cured sample of 1 mm thickness.

2. The gas leak locating material according to claim 1, wherein the viscosity A of the gas leak locating material at 25° C. at the shear rate of $0.1~s^{-1}$ is 500 Pa's or higher.

3. The gas leak locating material according to claim 1, wherein the gas leak locating material further contains a colorant.

4. The gas leak locating material according to claim 1, wherein the gas leak locating material cures by irradiation with light having a wavelength of 420 nm or shorter.

5. A gas leak repairing material, comprising:
the gas leak locating material according to claim 1,
wherein the gas leak locating material is used for repairing the gas leaking position.

6. A gas leak locating method, comprising:
forming a coating film formed of the gas leak locating material according to claim 1 at the position suspected to have the gas leak, and locating a position at which a hole opens in the coating film due to the gas leak as the gas leaking position.

7. A gas leak repairing method, comprising:
curing the coating film in which the gas leaking position located by the gas leak locating method according to claim 6 is included; and
closing the gas leaking position that has been cured, with a gas leak repairing material, and curing the gas leak repairing material, wherein
the gas leak repairing material contains a curable resin composition containing a polymerizable compound and a polymerization initiator,
the gas leak repairing material satisfies a formula: $A/B \geq 21.0$, where A represents a viscosity (Pa's) of the gas leak locating material at 25° C. at a shear rate of $0.1~s^{-1}$ and B represents a viscosity (Pa·s) of the gas leak locating material at 25° C. at a shear rate of $10~s^{-1}$, and
the gas leak locating material has an elastic modulus E' of 10 MPa or higher at 50° C. after being cured, where the elastic modulus E' is determined by performing a temperature sweep using a rheometer in tensile mode at a frequency of 10 Hz, with a temperature elevation rate of 10° C./min, over a temperature range from 25° C. through 100° C., on a cured sample of 1 mm thickness.

8. A gas leak repairing method, comprising:
curing the coating film with a tubular member disposed at the gas leaking position in the coating film in which the gas leaking position located by the gas leak locating method according to claim 6 is included, and
filling the tubular member with a gas leak repairing material, subsequently connecting an openable/closable valve in an open state thereof to the tubular member that bores by a gas leaking pressure, and closing the openable/closable valve, wherein
the gas leak repairing material contains a curable resin composition containing a polymerizable compound and a polymerization initiator,
wherein the gas leak repairing material satisfies a formula: $A/B \geq 21.0$, where A represents a viscosity (Pa's) of the gas leak locating material at 25° C. at a shear rate of $0.1~s^{-1}$ and B represents a viscosity (Pa's) of the gas leak locating material at 25° C. at a shear rate of $10~s^{-1}$, and
the gas leak locating material has an elastic modulus E' of 10 MPa or higher at 50° C. after being cured, where the elastic modulus E' is determined by performing a temperature sweep using a rheometer in tensile mode at a frequency of 10 Hz, with a temperature elevation rate of 10° C./min, over a temperature range from 25° C. through 100° C., on a cured sample of 1 mm thickness.

9. A gas leak repairing device, comprising:
a light source; and
a film-shaped member or a tape-shaped member on an emitting side of the light source, the film-shaped member or the tape-shaped member having ultraviolet transmittance,
wherein the gas leak repairing material according to claim 5 is attachable on the film-shaped member and the tape-shaped member.

10. The gas leak repairing device according to claim 9, wherein surfaces of the film-shaped member and the tape-shaped member have releasability.

11. A gas leak repairing method, comprising:
using the gas leak repairing device according to claim 9.

12. The gas leak locating material according to claim 1, wherein the curable resin composition is cured by photocuring, thermal curing, two-pack mixing, moisture curing, or a combination thereof.

* * * * *